(12) United States Patent
Amano et al.

(10) Patent No.: US 12,432,431 B2
(45) Date of Patent: Sep. 30, 2025

(54) IMAGING APPARATUS WITH HEAT DISSIPATION MEMBER HAVING HIGH COOLING EFFICIENCY

(71) Applicant: Panasonic Intellectual Property Management Co., Ltd., Osaka (JP)

(72) Inventors: Takuya Amano, Osaka (JP); Norikazu Kaneda, Osaka (JP); Yuuji Matsuo, Osaka (JP); Tatsuya Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 181 days.

(21) Appl. No.: 18/226,523

(22) Filed: Jul. 26, 2023

(65) Prior Publication Data

US 2024/0048827 A1 Feb. 8, 2024

(30) Foreign Application Priority Data

Aug. 8, 2022 (JP) .................... 2022-126626

(51) Int. Cl.
*H04N 23/52* (2023.01)

(52) U.S. Cl.
CPC .................... *H04N 23/52* (2023.01)

(58) Field of Classification Search
CPC ...................................... H04N 23/52
USPC ...................................... 165/80.3
See application file for complete search history.

(56) References Cited

U.S. PATENT DOCUMENTS 9,485,451 B2 * 11/2016 Kawamura ............. H04N 5/64

FOREIGN PATENT DOCUMENTS

| JP | H05-087739 U | 11/1993 |
| JP | 2013-162017 A | 8/2013 |
| JP | 2016-062953 A | 4/2016 |
| JP | 2018098245 A * | 6/2018 |

* cited by examiner

*Primary Examiner* — Steve S Tanenbaum
(74) *Attorney, Agent, or Firm* — Renner, Otto, Boisselle & Sklar, LLP

(57) ABSTRACT

The imaging apparatus includes a first object to be cooled, a second object to be cooled, and a heat dissipation member including a first connection part connected to the first object to be cooled, a second connection part connected to the second object to be cooled, and a first fin. The first connection part is provided at a position closer to the first fin than the second connection part. The heat dissipation member includes a cutout in a portion between the second connection part and the first fin.

5 Claims, 23 Drawing Sheets

EXAMPLE

COMPARATIVE EXAMPLE

IMAGING APPARATUS WITH HEAT DISSIPATION MEMBER HAVING HIGH COOLING EFFICIENCY

BACKGROUND OF THE INVENTION

Field of the Invention

The present disclosure relates to an imaging apparatus.

Description of the Related Art

For example, JP 2018-98245 A discloses an electronic device in which a plurality of objects to be cooled (substrates) are connected to a single heat dissipation member (heat sink). A plurality of objects to be cooled are cooled by transferring their heat to the heat dissipation member.

SUMMARY OF THE INVENTION

In the electronic device described in JP 2018-98245 A, when a large amount of heat is transferred from any one of a plurality of objects to be cooled to a single heat dissipation member, the heat of the rest of the objects to be cooled is not sufficiently transferred to the heat dissipation member, and this may result in decrease in cooling efficiency of the rest of the objects to be cooled.

For an imaging apparatus in which a plurality of objects to be cooled are connected to a single heat dissipation member, an object of the present disclosure is to maintain high cooling efficiency for each object to be cooled.

According to one aspect of the present disclosure, an electronic device is provided to solve the above problem.

The electronic device includes
a first object to be cooled,
a second object to be cooled, and
a heat dissipation member including a first connection part connected to the first object to be cooled, a second connection part connected to the second object to be cooled, and a first fin.

The first connection part is provided at a position closer to the first fin than the second connection part, and
the heat dissipation member includes a cutout in a portion between the second connection part and the first fin.

According to the present disclosure, in an imaging apparatus in which a plurality of objects to be cooled are connected to a single heat dissipation member, high cooling efficiency can be maintained for each object to be cooled.

DESCRIPTION OF THE PREFERRED EMBODIMENTS

Figure 1:
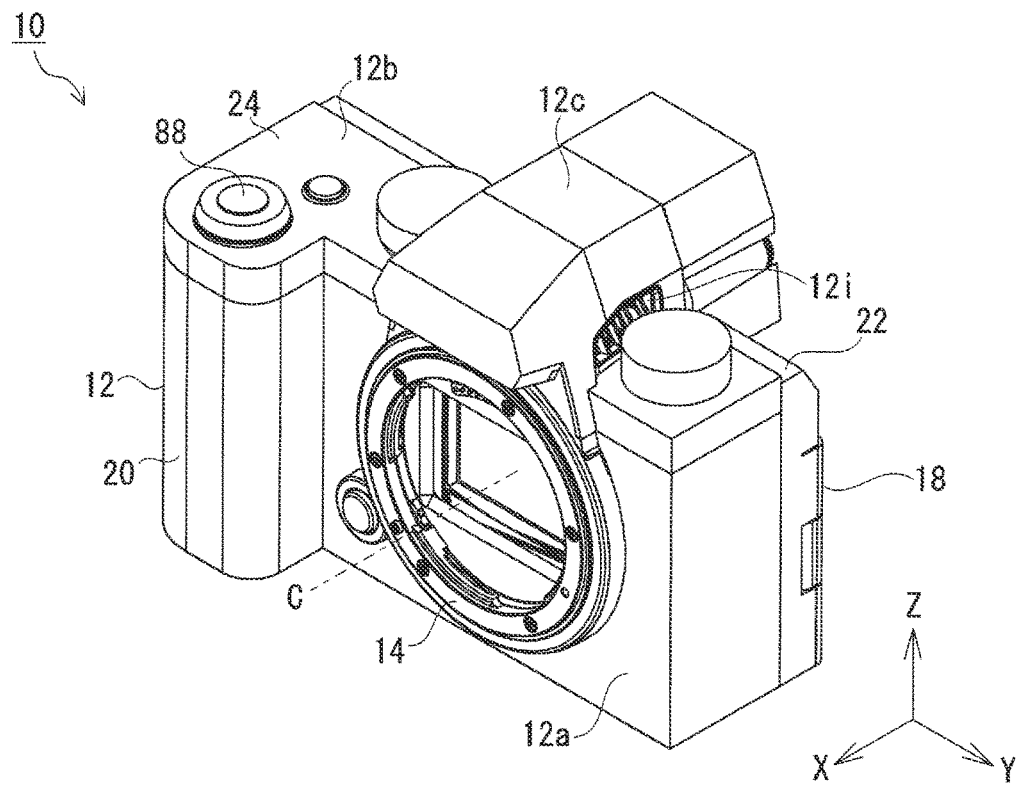
FIG. 1 is a right front perspective view of an imaging apparatus according to one embodiment of the present disclosure.
Figure 2:
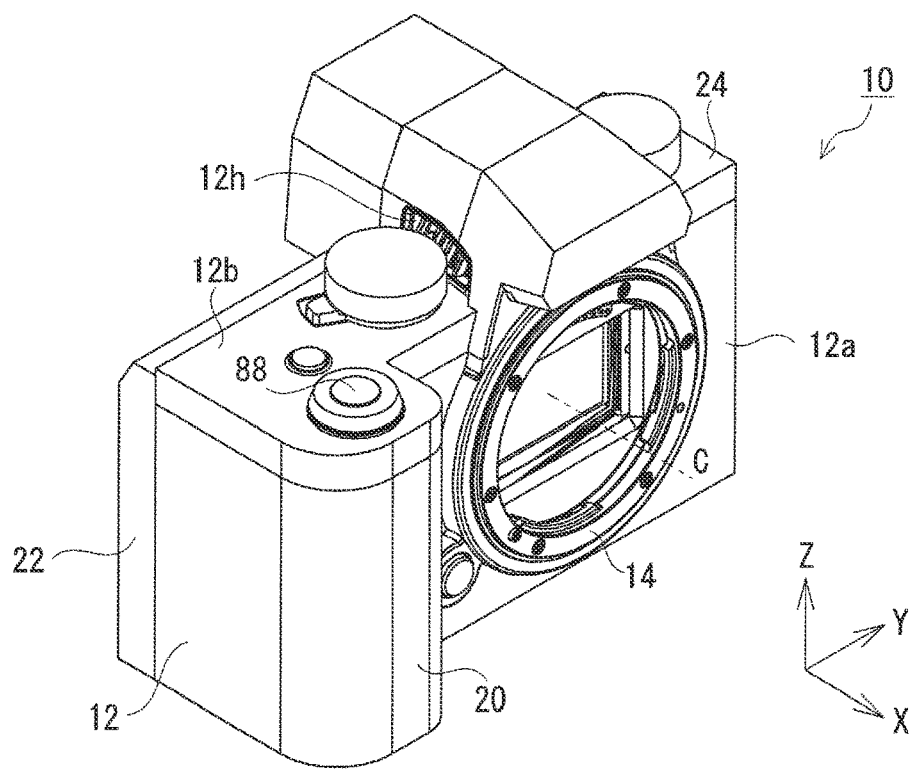
FIG. 2 is a left front perspective view of the imaging apparatus according to one embodiment of the present disclosure.

Embodiments will be described in detail with reference to the drawings as appropriate. Unnecessarily detailed description may be omitted. For example, detailed description of a well-known matter and a repeated description of substantially the same configuration may be omitted. This is to avoid unnecessary redundancy of the following description and to facilitate understanding of those skilled in the art.

Note that, the inventor (inventors) provides the accompanying drawings and the following description in order for those skilled in the art to fully understand the present disclosure, and does not intend to limit the subject matter described in the claims by the accompanying drawings and the following description.

An imaging apparatus according to an embodiment of the present disclosure will be described with reference to the drawings.

FIGS. 1 to 5 are respectively a right front perspective view, a left front perspective view, a rear perspective view, a front view, and a bottom view of an imaging apparatus according to one embodiment of the present disclosure. Part of the imaging apparatus is schematically illustrated.

An X-Y-Z orthogonal coordinate system illustrated in the drawing is for facilitating understanding of the embodiment of the present disclosure, and does not limit the embodiment of the present disclosure. An X-axis direction is a front-rear direction, a Y-axis direction is a left-right direction, and a Z-axis direction is a height direction of the imaging apparatus. Furthermore, a side where a subject exists when photographing is defined as a front side of the imaging apparatus.

As illustrated in FIGS. 1 to 5, an imaging apparatus 10 according to the embodiment has a design similar to that of a single-lens reflex camera including a pentamirror. The imaging apparatus 10 includes a housing 12. The housing 12 is provided with a lens mount 14 and an electronic view finder (EVF) 16. Specifically, the lens mount 14 is provided on a front surface 12a of the housing 12. The electronic view finder 16 is provided in an upper protruding part 12c protruding from a substantially central portion, in the left-right direction, of a top surface 12b of the housing 12. The lens mount 14 and the electronic view finder 16 are provided so as to intersect with a virtual plane (Z-X plane) extending in the height direction (Z-axis direction) and including an optical axis C of the lens mount 14 (optical axis of a lens mounted on the lens mount 14). A female screw hole 12d for mounting on a camera platform is provided in a bottom surface 12e of the housing 12 so as to intersect with the virtual plane.

In the embodiment, a monitor 18 of vari-angle type is provided on a rear surface 12f of the housing 12. The monitor 18 of vari-angle type is provided to the housing 12 so as to be rotatable about a first center line of rotation extending in the height direction (Z-axis direction) and a second center line of rotation extending in a direction orthogonal to the first center line of rotation.

Figure 6:
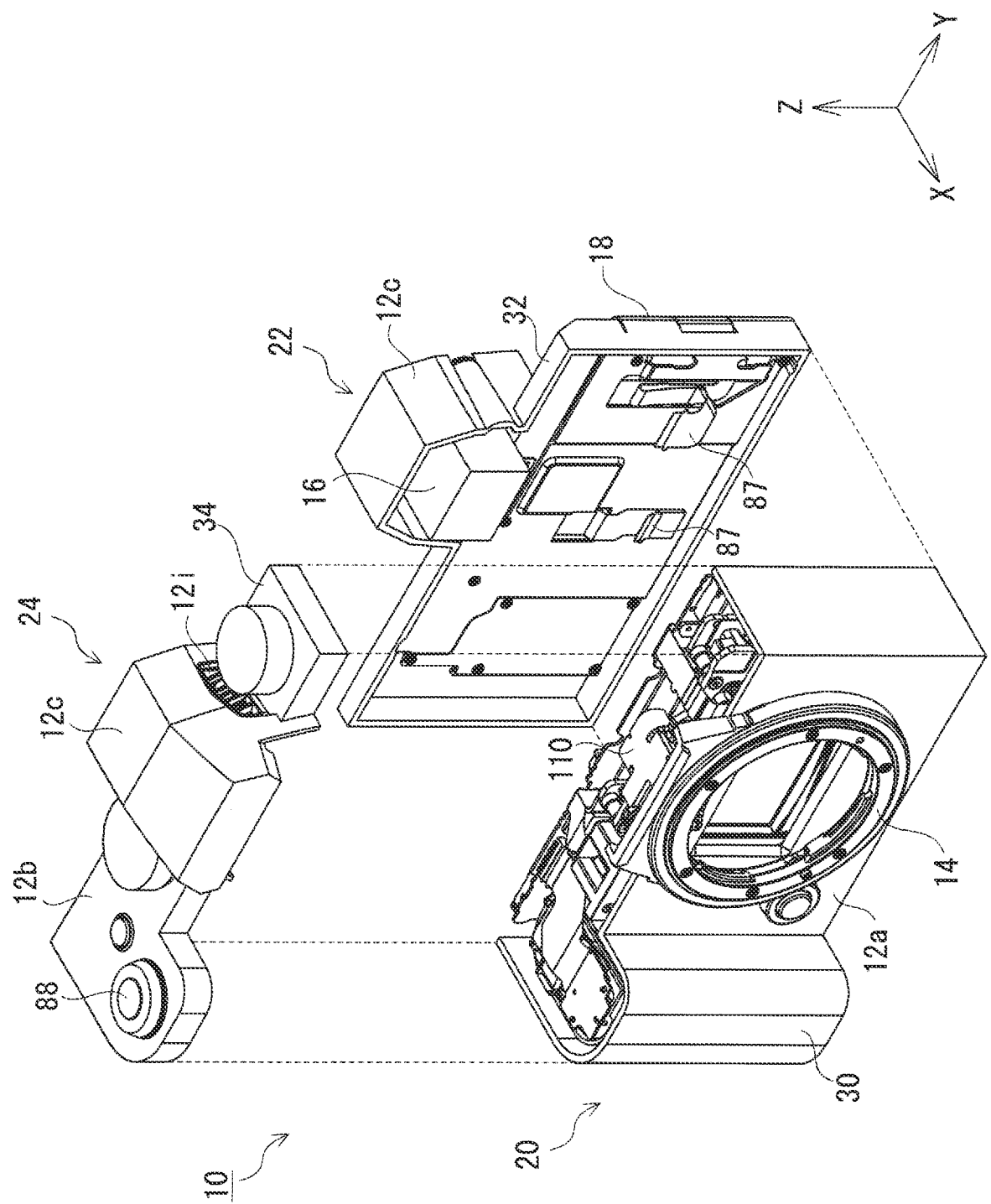
FIG. 6 is an exploded perspective view of the imaging apparatus according to one embodiment of the present disclosure.

FIG. 6 is an exploded perspective view of the imaging apparatus according to one embodiment of the present disclosure.

As illustrated in FIG. 6, the imaging apparatus 10 according to the embodiment includes a front unit 20, a rear unit 22, and a top unit 24.

The front unit 20 constitutes a part of the housing 12 and includes a front casing 30 including at least the front surface 12a of the housing 12.

The rear unit 22 constitutes a part of the housing 12 and includes a rear casing 32 including at least the rear surface 12f of the housing 12. The rear casing 32 includes a rear portion of the upper protruding part 12c.

The top unit 24 constitutes a part of the housing 12 and includes a top casing 34 including at least the top surface 12b of the housing 12. The top casing 34 includes a front portion of the upper protruding part 12c.

The front casing 30, the rear casing 32, and the top casing 34 are fixed together using screws, for example, to form the housing 12 of the imaging apparatus 10.

Figure 7:
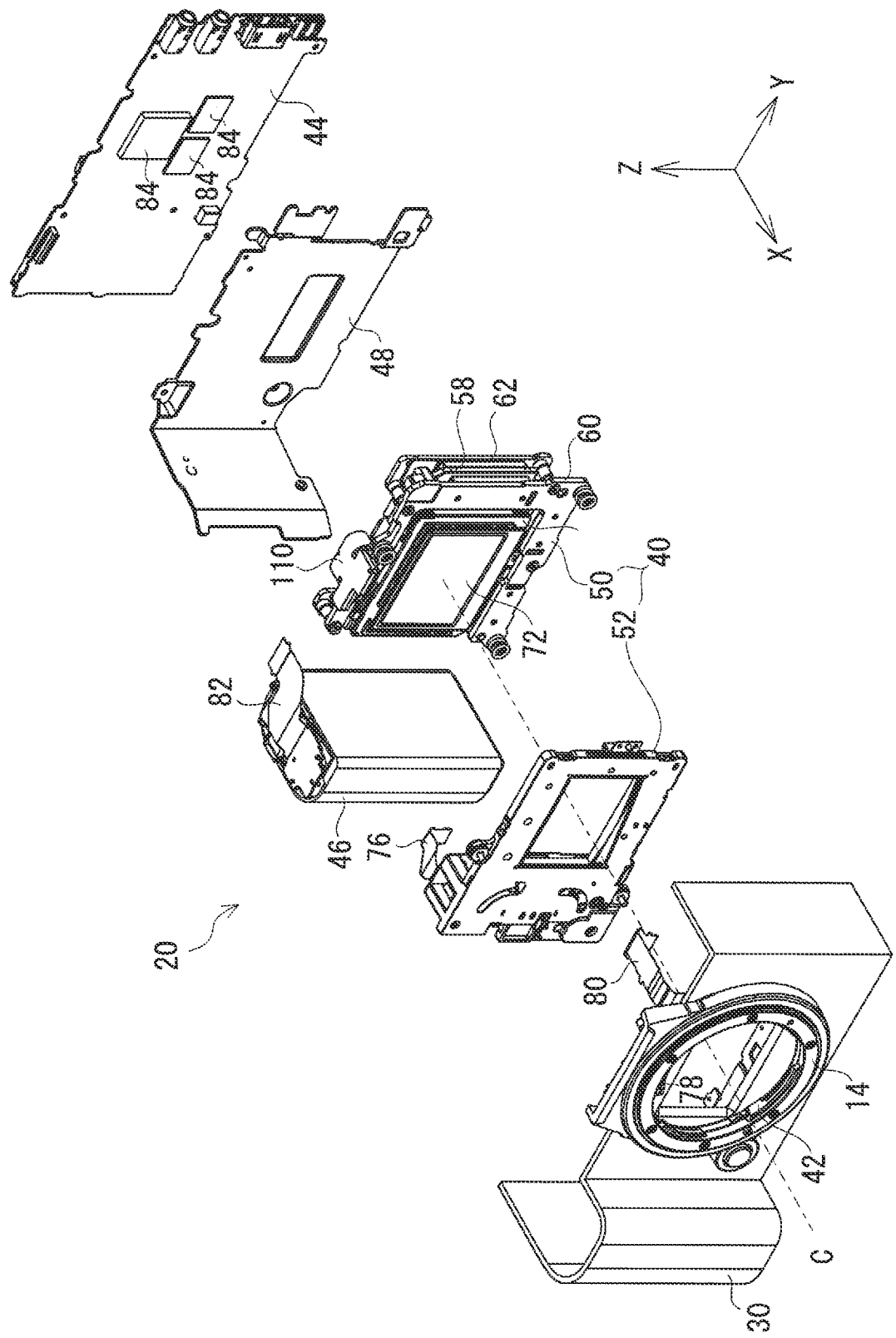
FIG. 7 is a front exploded perspective view of a front unit of the imaging apparatus according to one embodiment of the present disclosure.
Figure 8:
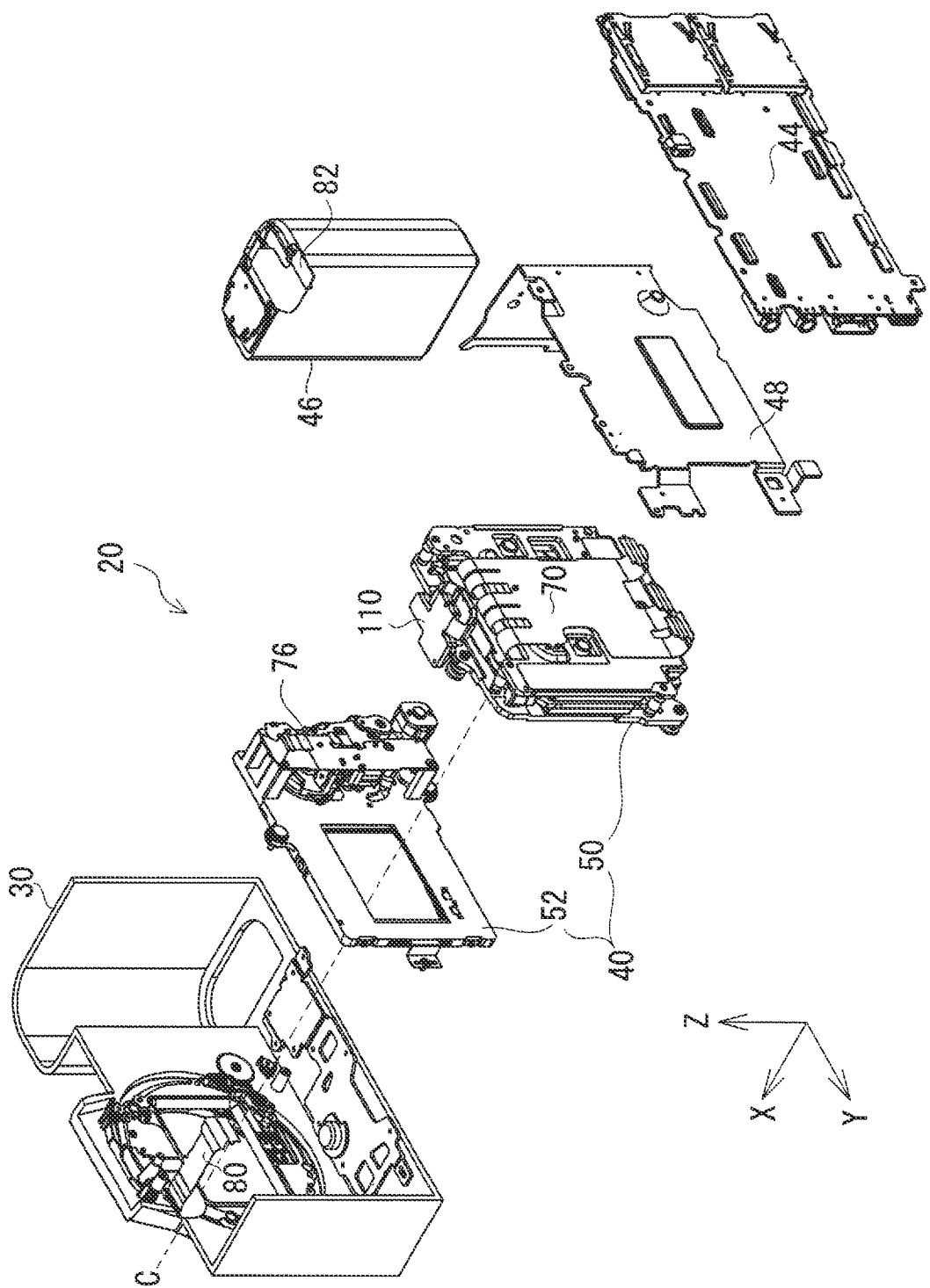
FIG. 8 is a rear exploded perspective view of the front unit of the imaging apparatus according to one embodiment of the present disclosure.

FIGS. 7 and 8 are respectively a front exploded perspective view and a rear exploded perspective view of the front unit of the imaging apparatus according to one embodiment of the present disclosure.

As illustrated in FIGS. 7 and 8, the front unit 20 includes, besides the front casing 30, an imaging module 40, a lens mount module 42, a main circuit board 44, a battery 46, and a heat transfer plate 48. The imaging module 40 includes a sensor module 50 and a shutter module 52.

Figure 9:
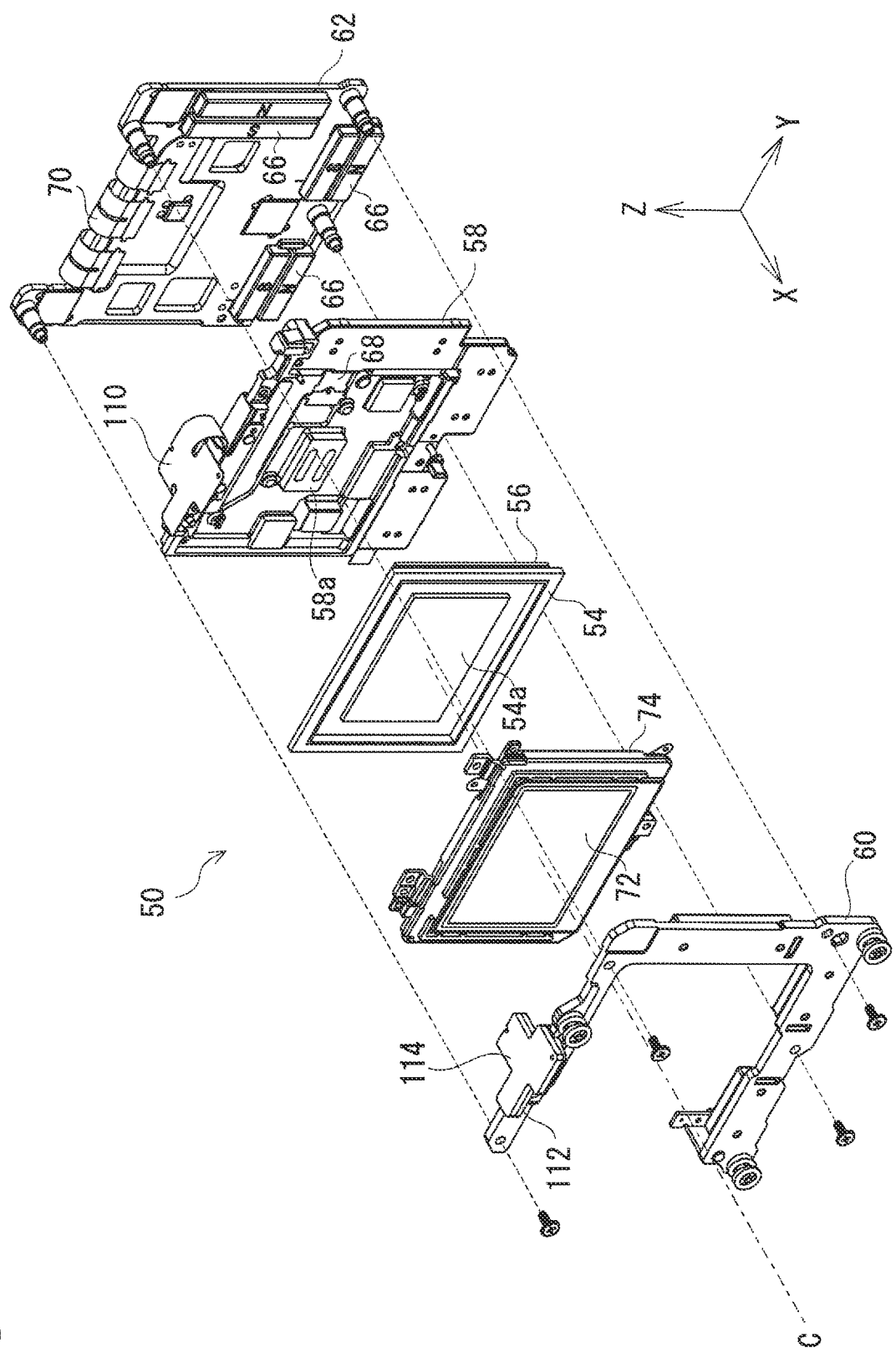
FIG. 9 is a front exploded perspective view of a sensor module of the imaging apparatus according to one embodiment of the present disclosure.
Figure 10:
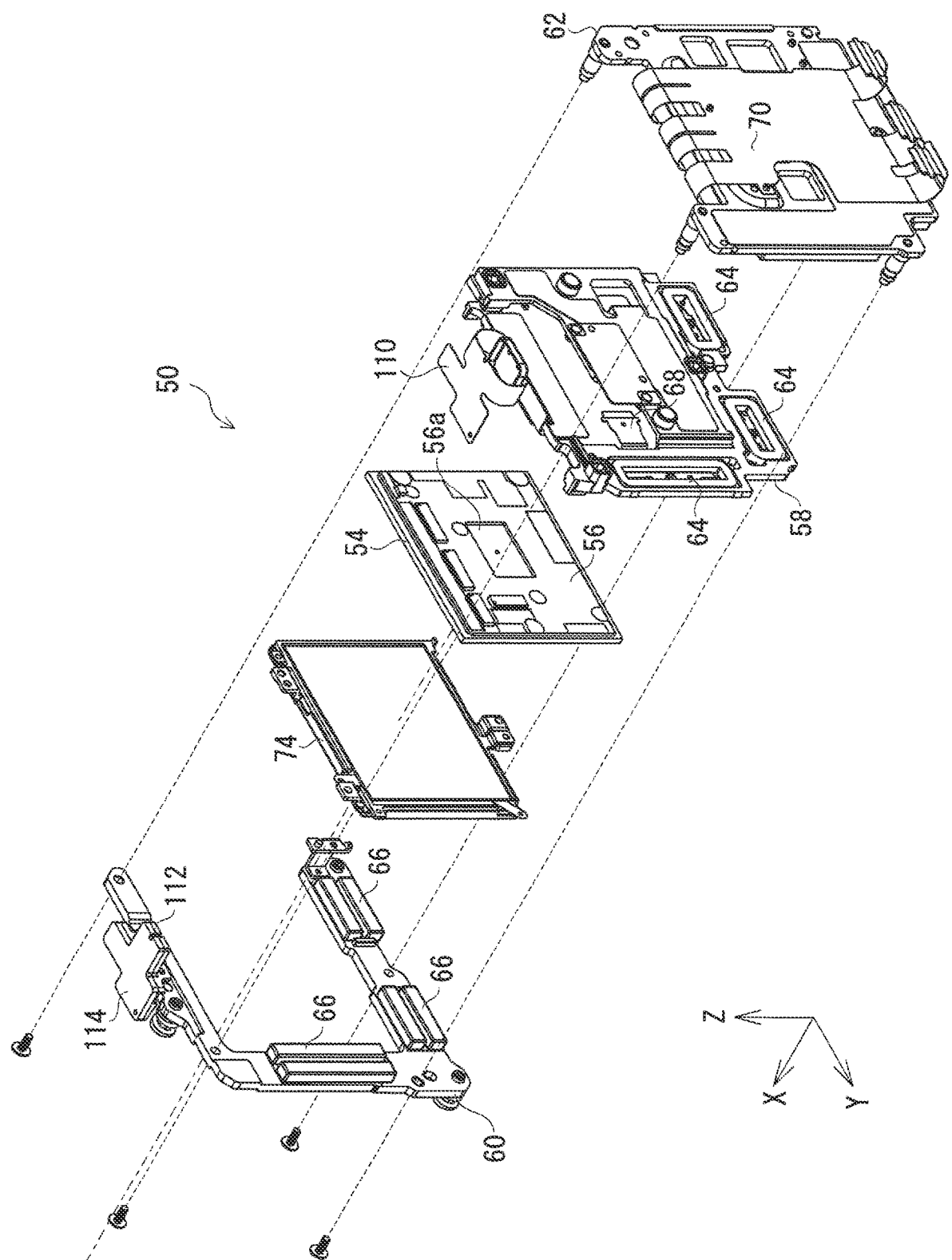
FIG. 10 is a rear exploded perspective view of the sensor module of the imaging apparatus according to one embodiment of the present disclosure.

FIGS. 9 and 10 are respectively a front exploded perspective view and a rear exploded perspective view of the sensor module of the imaging apparatus according to one embodiment of the present disclosure.

As illustrated in FIGS. 9 and 10, the sensor module 50 of the imaging module 40 includes an image sensor 54. The image sensor 54 is a device that receives an image light that has passed through the lens attached to the lens mount 14 by a light receiving surface 54a and converts the received image light into an electric signal. The image sensor 54 is mounted on a circuit board 56.

In the embodiment, the imaging apparatus 10 is configured to perform shake correction. That is, the sensor module 50 is configured such that the image sensor 54 is displaceable in a direction orthogonal to the optical axis C to prevent shaking of images due to vibration of a hand of a user holding the imaging apparatus 10. Specifically, the sensor module 50 includes a movable frame 58 that supports the image sensor 54, a front frame 60, and a rear frame 62. The front frame 60 and the rear frame 62 support the movable frame 58 so as to be movable in the left-right direction (Y-axis direction) and the height direction (Z-axis direction). The sensor module 50 is fixed to the front casing 30 via the front frame 60.

The front frame 60 and the rear frame 62 are fixed to each other and support the movable frame 58 therebetween, allowing the movable frame 58 to be displaced. A plurality of coils 64 and a plurality of magnets 66 for displacing the movable frame 58 are provided to the movable frame 58, the front frame 60, and the rear frame 62. The coils 64 of the movable frame 58 are disposed between the magnets 66 of the front frame 60 and the magnets 66 of the rear frame 62. When a current flows in the coil 64, the coil 64 is displaced in a magnetic field generated between the magnets 66. This displaces the movable frame 58, and thereby displaces the image sensor 54 supported by the movable frame 58 via the circuit board 56.

The coils 64 are electrically connected to the circuit board 56 via a flexible cable 68. The circuit board 56 is electrically connected to the main circuit board 44 via a flexible cable 70.

The movable frame 58 includes a filter module 74 including a protective glass 72 and a plurality of optical filters such as an infrared cut glass, and is positioned in front of the image sensor 54.

The image sensor 54 is connected to (in contact with) the movable frame 58 to allow heat transfer there between. Specifically, a projecting part 58a provided to the movable frame 58 contacts the image sensor 54 through a through hole 56a formed in the circuit board 56, whereby the image sensor 54 and the movable frame 58 are connected to each other to transfer heat therebetween. As a result, the heat generated by the image sensor 54 during imaging is absorbed by the movable frame 58. The movable frame 58 is made of a material having high thermal conductivity, such as aluminum, to absorb heat of the image sensor 54. Transfer of heat from the movable frame 58 will be described later.

As illustrated in FIGS. 7 and 8, the shutter module 52 of the imaging module 40 is disposed in front of the sensor module 50. The shutter module 52 includes a shutter for adjusting exposure time. The shutter module 52 is electrically connected to the main circuit board 44 via a flexible cable 76.

The lens mount module 42 includes the lens mount 14, and an electronic contact 78 to make electrical connection to the lens attached to the lens mount 14. The electronic contact 78 is electrically connected to the main circuit board 44 via a flexible cable 80.

The main circuit board 44 is disposed behind the imaging module 40. The battery 46 is electrically connected to the main circuit board 44 via a flexible cable 82. The main circuit board 44 controls, for example, the image sensor 54 of the sensor module 50, the shutter of the shutter module 52, and the lens attached to the lens mount 14.

The heat transfer plate 48 is a member for mainly cooling a plurality of IC chips 84 mounted on the main control board 44, and is in contact with the IC chips 84 via, for example, a heat transfer sheet (not illustrated). That is, the heat transfer plate 48 and the IC chips 84 are connected so as to allow heat transfer therebetween. The IC chip 84 is, for example, an image processing chip that generates image data based on an electric signal from the image sensor 54, or a memory that stores image data. Heat generated by the IC chip 84 during operation is absorbed by the heat transfer plate 48. The heat transfer plate 48 is made of a material having high thermal conductivity, such as aluminum, to absorb heat of the IC chip 84. Transfer of heat from the heat transfer plate 48 will be described later.

Figure 3:
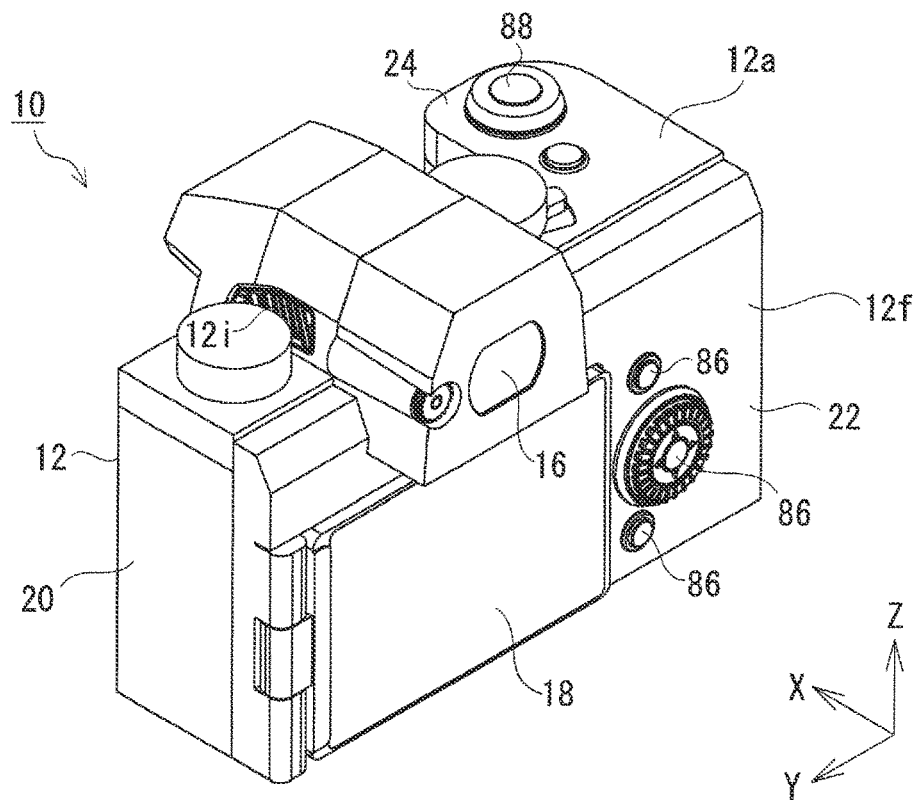
FIG. 3 is a rear perspective view of the imaging apparatus according to one embodiment of the present disclosure.
Figure 4:
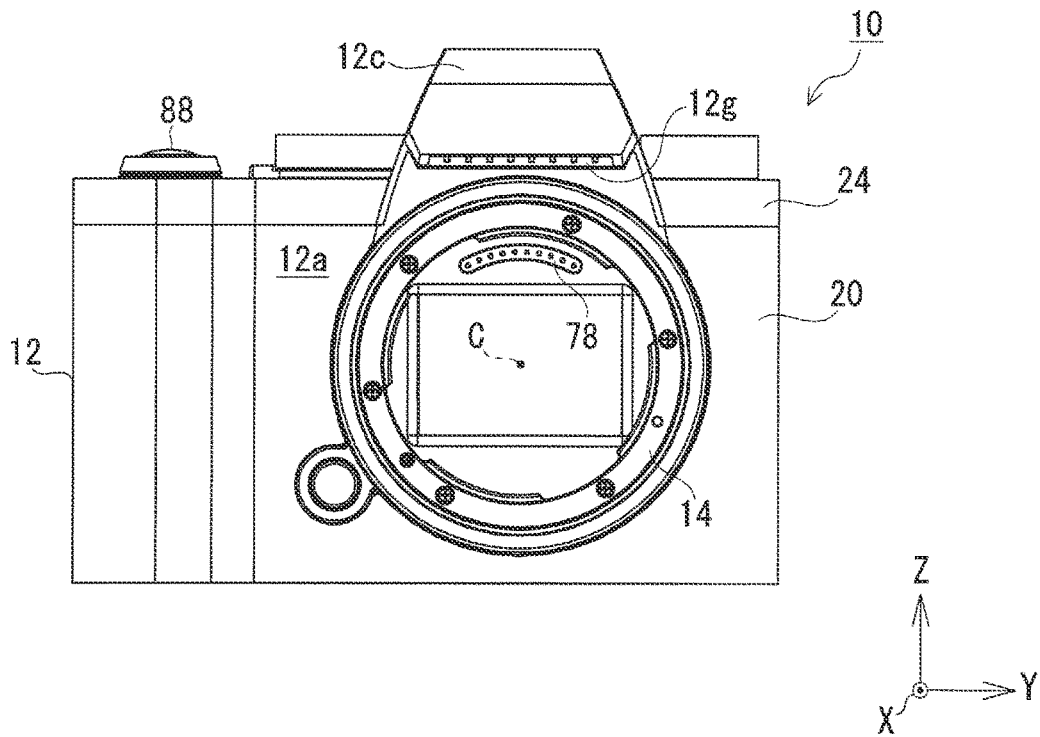
FIG. 4 is a front view of the imaging apparatus according to one embodiment of the present disclosure.

As illustrated in FIGS. 3 and 6, the rear unit 22 includes, besides the rear casing 32, the electronic view finder 16, the monitor 18, and a plurality of operation buttons 86. These are electrically connected to the main circuit board 44 via a flexible cable 87, Thus, the electronic view finder 16 and the monitor 18 are controlled by the main circuit board 44.

Figure 11:
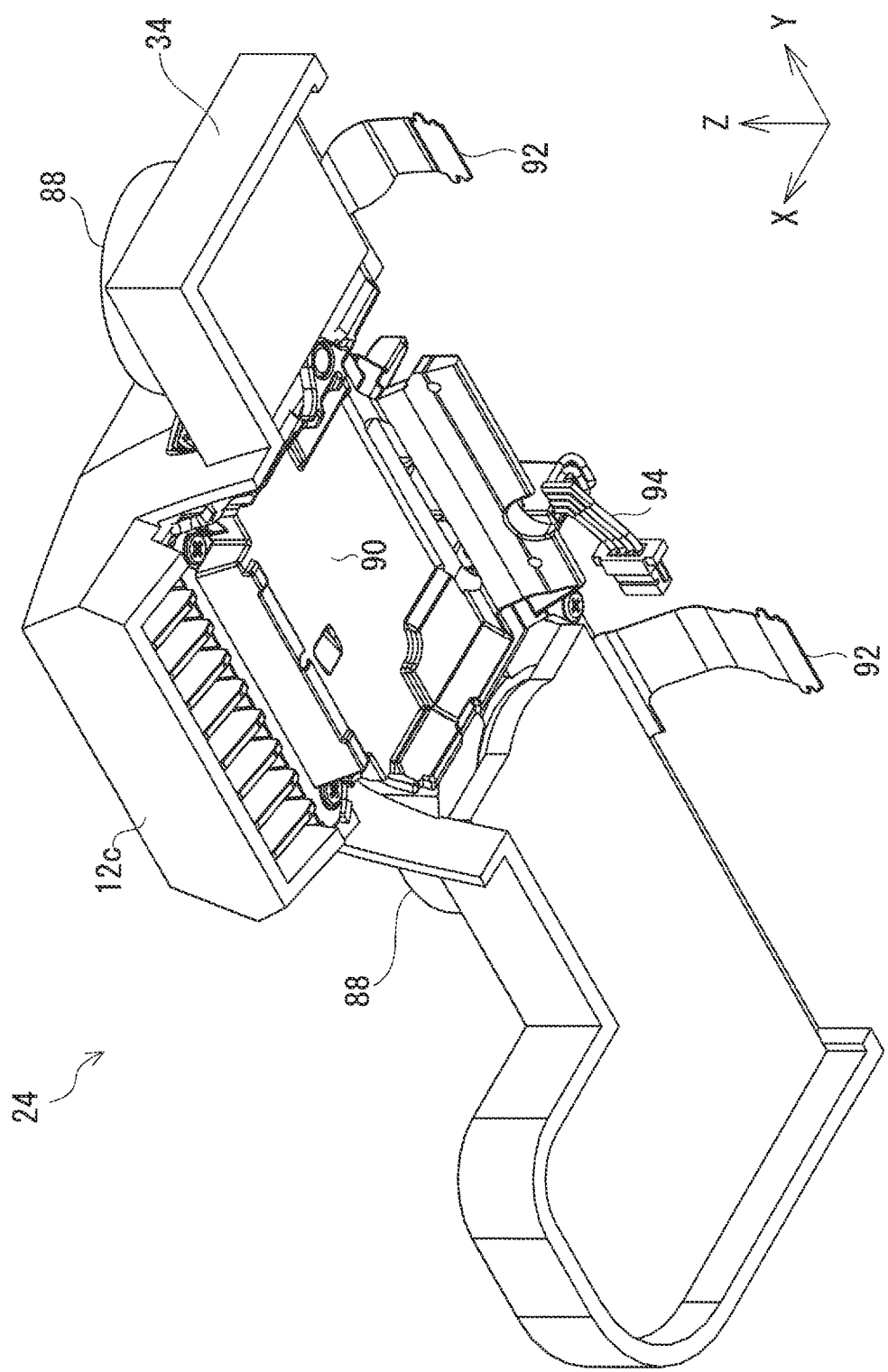
FIG. 11 is a lower perspective view of a top unit of the imaging apparatus according to one embodiment of the present disclosure.
Figure 12:
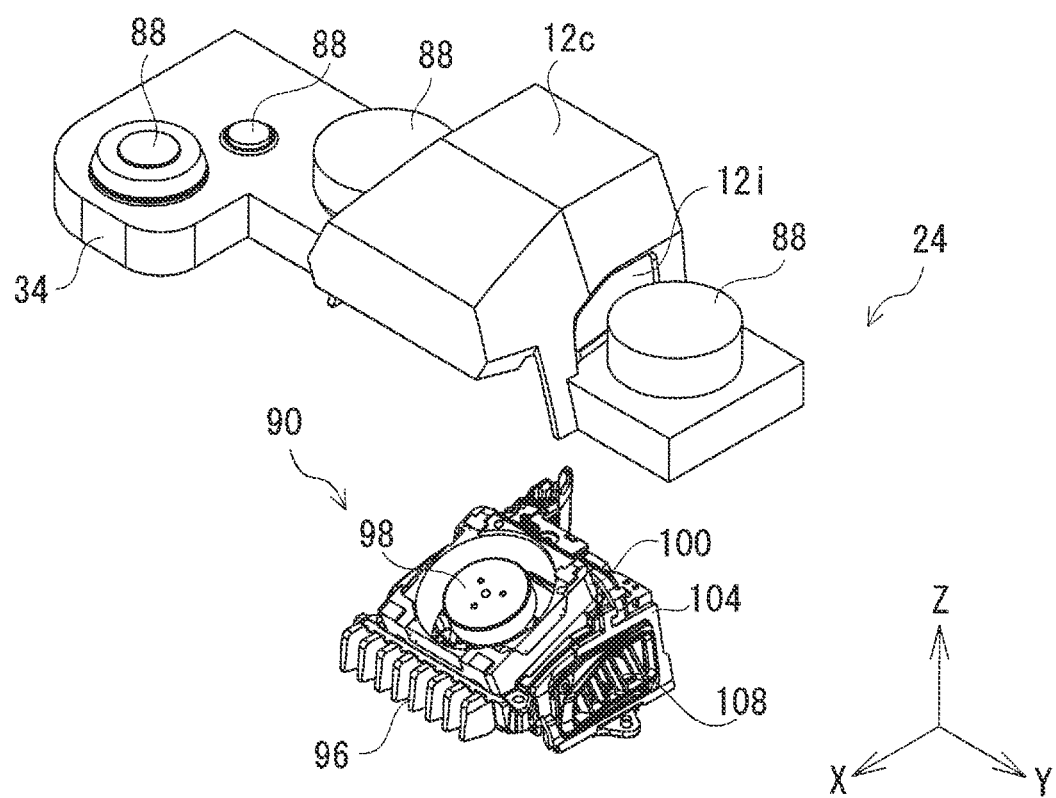
FIG. 12 is an exploded perspective view of the top unit of the imaging apparatus according to one embodiment of the present disclosure.

FIG. 11 is a lower perspective view of the top unit of the imaging apparatus according to one embodiment of the present disclosure. FIG. 12 is an exploded perspective view of the top unit of the imaging apparatus according to one embodiment of the present disclosure.

As illustrated in FIGS. 11 and 12, the top unit 24 includes, besides the top casing 34, a plurality of operation buttons 88, such as a shutter button, and a cooling module 90. The operation buttons 88 and the cooling module 90 are electrically connected to the main circuit board 44 via flexible cables 92 and 94.

The cooling module 90 forcibly cools the image sensor 54 on the sensor module 50 of the imaging module 40 and the IC chips 84 on the main circuit board 44, and is housed in the upper protruding part 12c of the housing 12. Note that, the cooling module 90 is housed in the upper protruding part 12c together with the electronic view finder 16, and is disposed in front of the electronic view finder 16.

Figure 13:
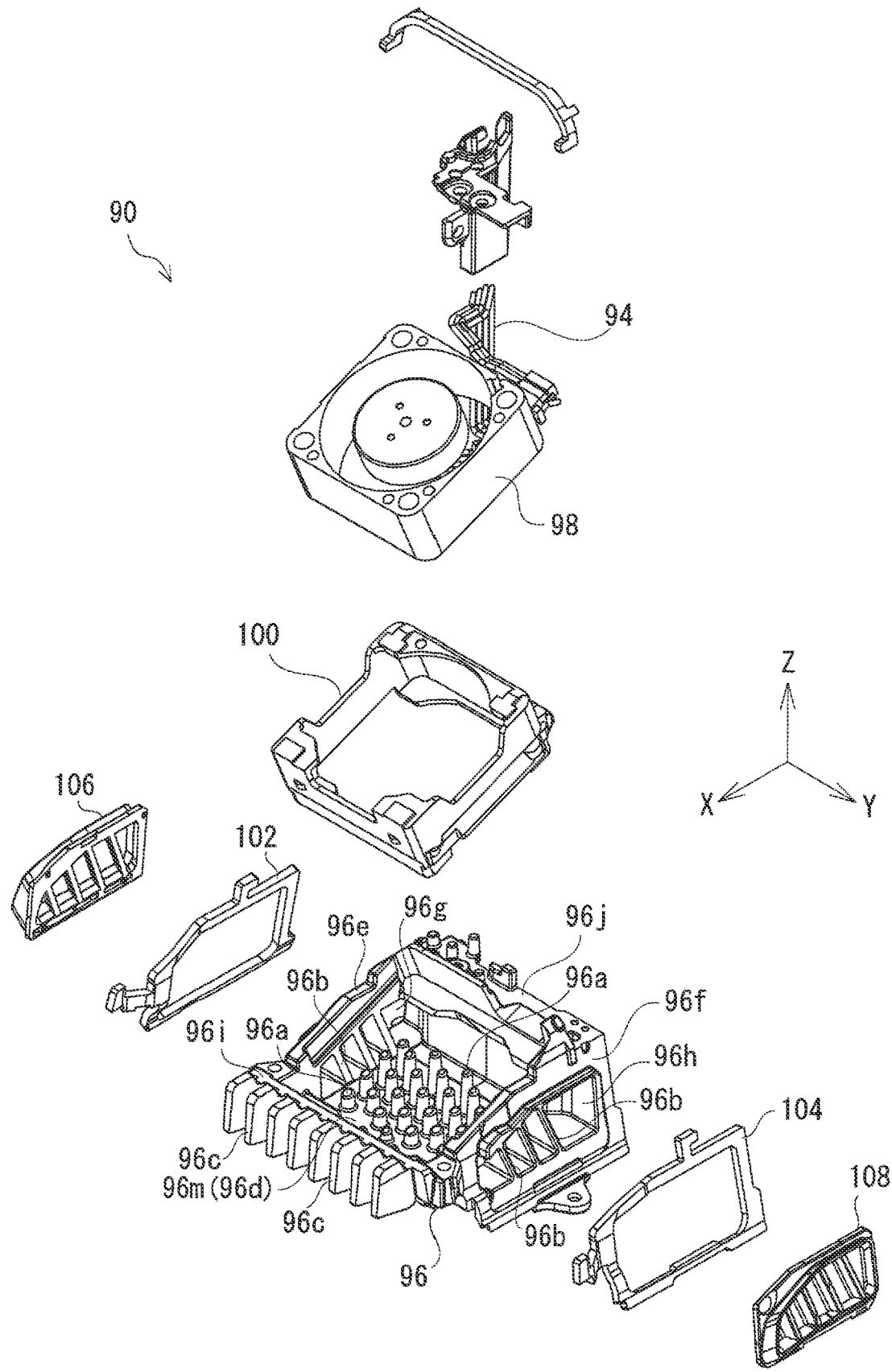
FIG. 13 is an exploded perspective view of a cooling module of the imaging apparatus according to one embodiment of the present disclosure.
Figure 14:
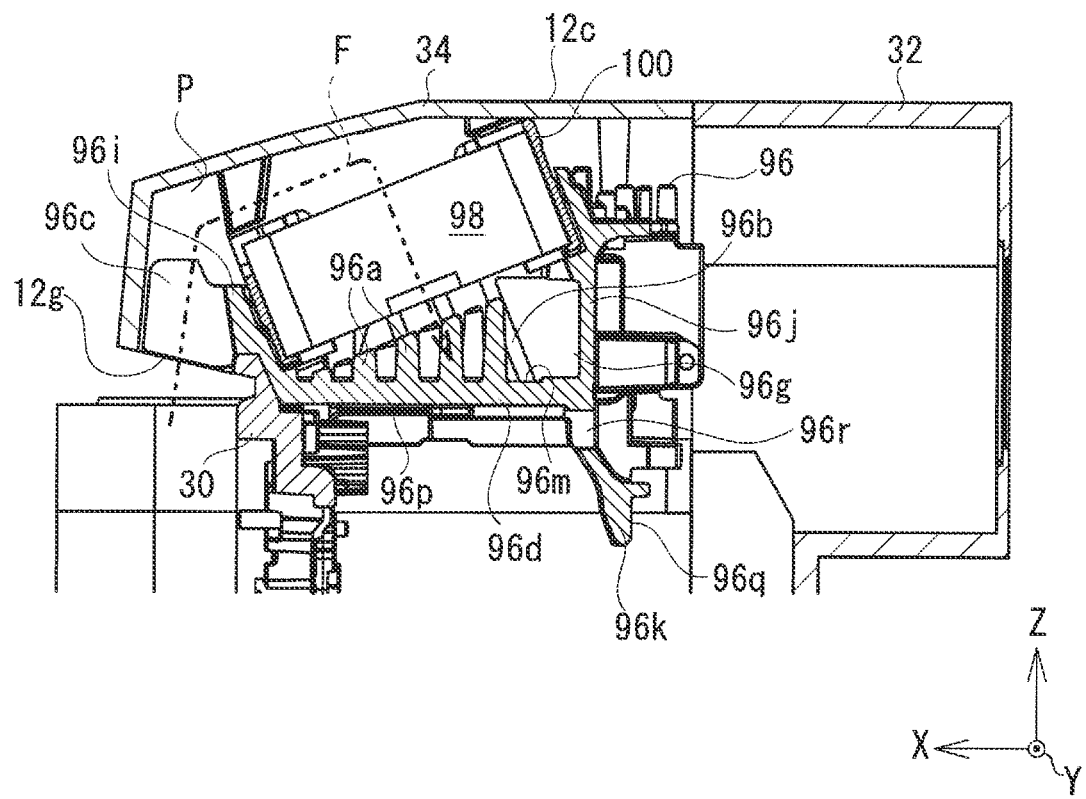
FIG. 14 is a partial cross-sectional view illustrating an air flow in an upper protruding part of the imaging apparatus according to one embodiment of the present disclosure.
Figure 15:
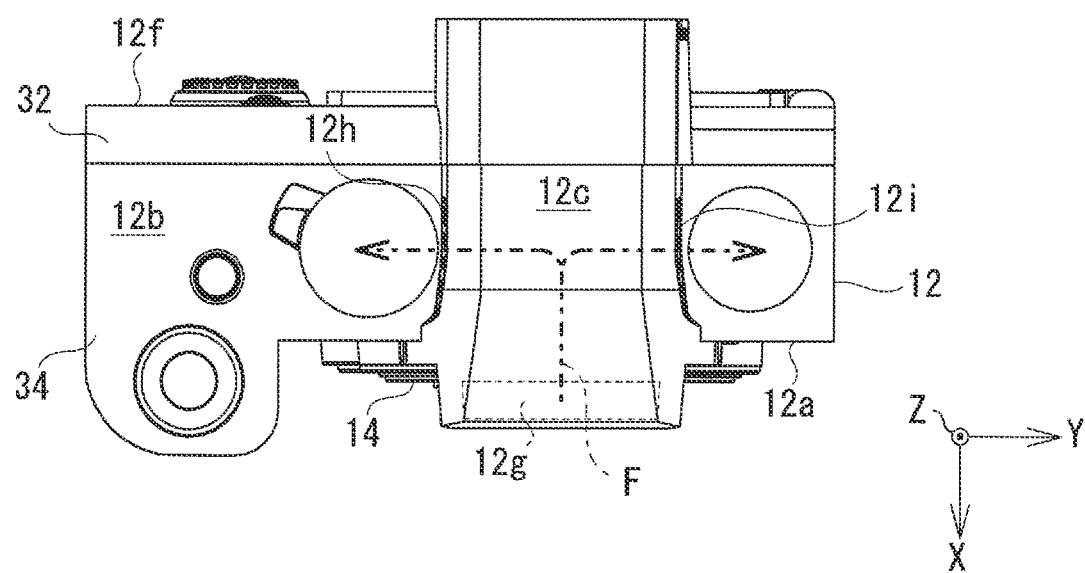
FIG. 15 is a top view illustrating an air flow in the upper protruding part of the imaging apparatus according to one embodiment of the present disclosure.
Figure 16:
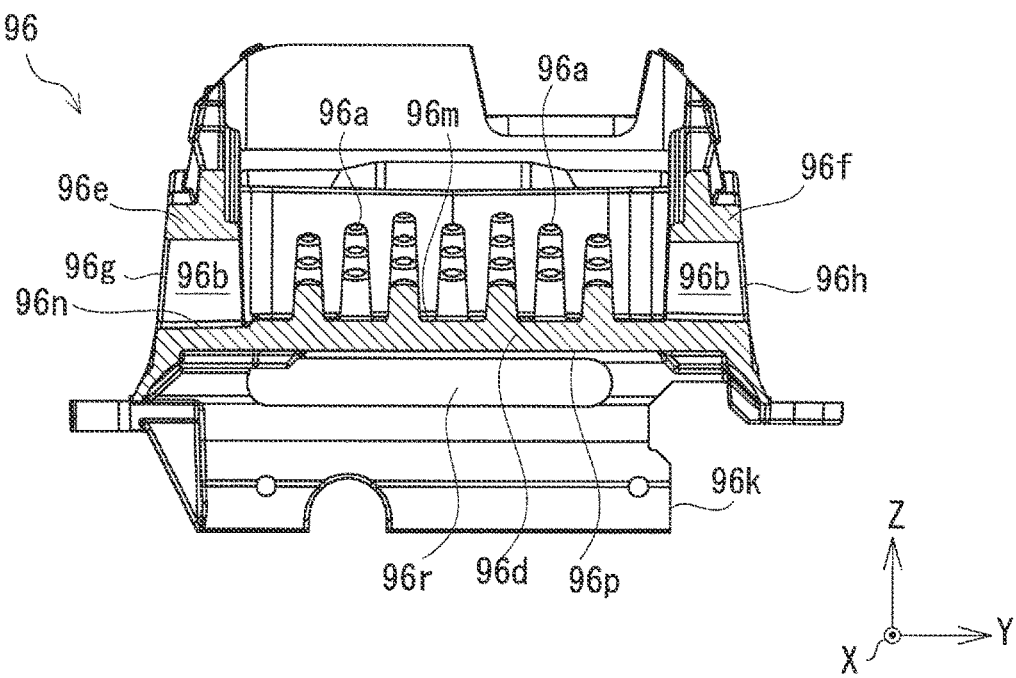
FIG. 16 is a cross-sectional view of a heat sink of the imaging apparatus according to one embodiment of the present disclosure.
Figure 17:
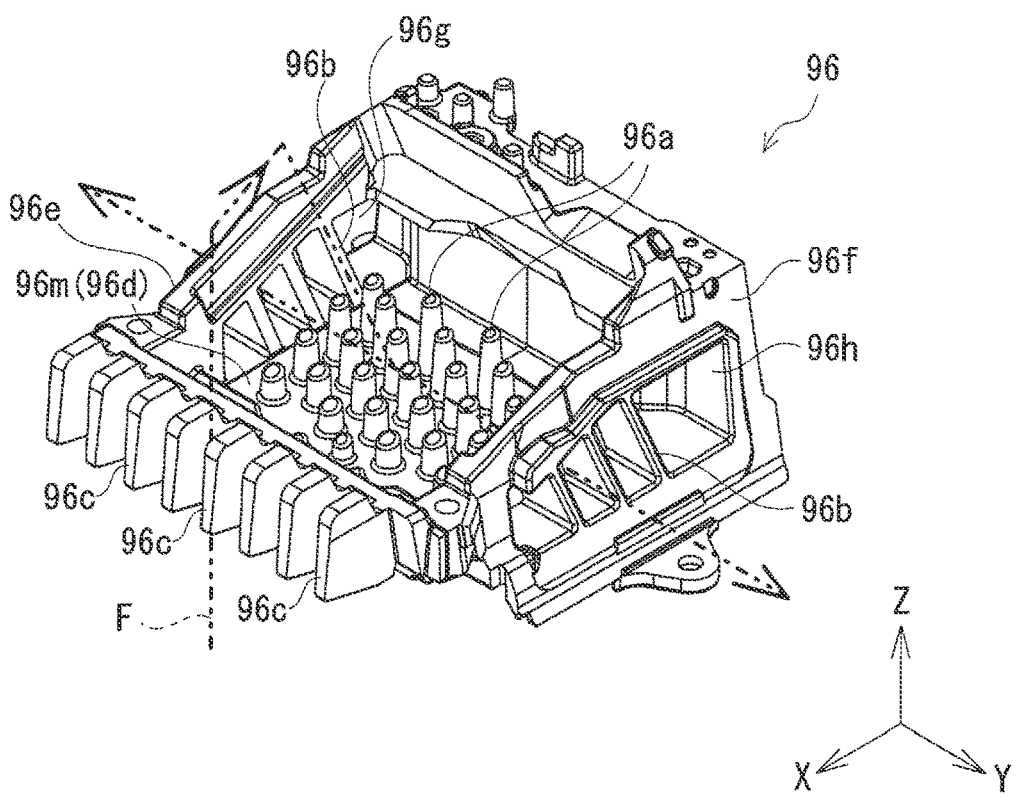
FIG. 17 is a perspective view illustrating air flows around the heat sink of the imaging apparatus according to one embodiment of the present disclosure.

FIG. 13 is an exploded perspective view of the cooling module of the imaging apparatus according to one embodiment of the present disclosure. FIG. 14 is a partial cross-sectional view illustrating an air flow in the upper protruding part of the imaging apparatus according to one embodiment of the present disclosure. FIG. 15 is a top view illustrating an air flow in the upper protruding part of the imaging apparatus according to one embodiment of the present disclosure. FIG. 16 is a cross-sectional view of a heat sink. FIG. 17 is a perspective view illustrating air flows around the heat sink.

As illustrated in FIGS. 13 and 14, the cooling module 90 includes a heat sink 96 (heat dissipation member) and a fan 98 that generates an air flow F for cooling the heat sink 96. The cooling module 90 includes a damper 100 for attaching the fan 98 to the heat sink 96. The damper 100 absorbs vibration of the fan 98. In the embodiment, the fan 98 is an axial fan, and is attached to the heat sink 96 so as to blow air from an obliquely upper front side toward an obliquely lower rear side.

Figure 5:
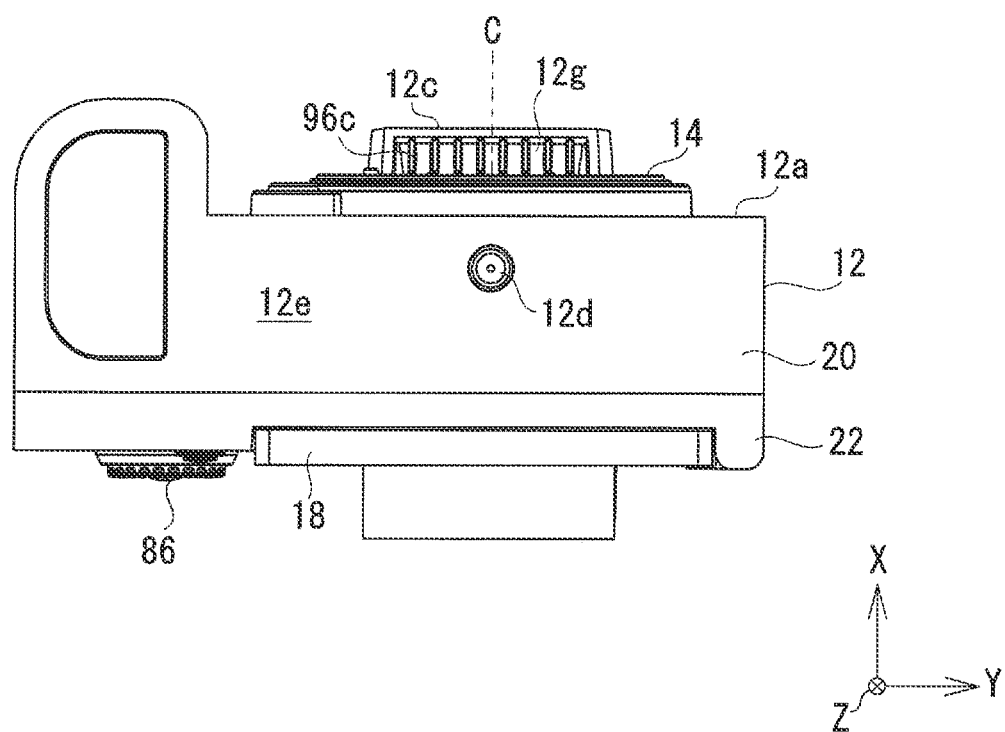
FIG. 5 is a bottom view of the imaging apparatus according to one embodiment of the present disclosure.

As illustrated in FIGS. 14 and 15, a flow path P of air (a flow path along which the air flow F is generated) is defined by the upper protruding part 12c of the top casing 34 and the cooling module 90. An intake port 12g at one end of the flow path P and exhaust ports 12h and 12i at other ends of the flow path P are formed in the upper protruding part 12c of the top casing 34. Specifically, in the embodiment, as illustrated in FIGS. 15 and 5, the intake port 12g is formed on a lower surface of a protruding portion of the upper protruding part 12c protruding forward from the front surface 12a of the housing 12. As illustrated in FIG. 15, the exhaust ports 12h and 12*i* are formed respectively on the left side surface and the right side surface of the upper protruding part 12*c*. The exhaust port 12*h* is on the opposite side of the exhaust port 12*i* in the left-right direction (Y-axis direction). The heat sink 96 of the cooling module 90 is disposed between the exhaust ports 12*h* and 12*i*.

The heat sink 96 includes first fins 96*a*, second fins 96*b*, and third fins 96*c* disposed in the flow path P. In the embodiment, the heat sink 96 has a box shape having an opening at the upper side to be covered by the fan 98, and is made of a material having high thermal conductivity such as aluminum.

Specifically, in the embodiment as illustrated in FIGS. 13, 14, 16, and 17, the heat sink 96 includes a rectangular bottom plate 96*d*, and a pair of left wall 96*e* and right wall 96*f* erected (in the embodiment, in the height direction (Z-axis direction)) from two ends, in the left-right direction (Y-axis direction), of the bottom plate 96*d* toward the fan 98. The left wall 96*e* and the right wall 96*f* respectively have a vent hole 96*g* and a vent hole 96*h* penetrating in the left-right direction to allow air to flow therethrough.

As illustrated in FIG. 14, the heat sink 96 includes a front wall 96*i* and a rear wall 96*j* erected (in the embodiment, in the height direction (Z-axis direction)) from two ends, in the front-rear direction (X-axis direction), of the bottom plate 96*d* toward the fan 98. As illustrated in FIG. 14, the heat sink 96 includes a tongue part 96*k* extending in a direction away from the fan 98 (in the embodiment, downward) from one end, in the front-rear direction (in the embodiment, rear end), of the bottom plate 96*d*.

As illustrated in FIG. 14, a plurality of first fins 96*a* are erected in the height direction (Z-axis direction) from a first surface 96*m*, which faces the fan 98, of the bottom plate 96*d* of the heat sink 96 toward the fan 98. The first fin 96*a* is a pin-shaped fin and, in the embodiment, has a circular cross section. In the embodiment, as illustrated in FIG. 17, a plurality of first fins 96*a* are disposed in a staggered arrangement on the first surface 96*m*.

As illustrated in FIGS. 13, 16, and 17, a plurality of second fins 96*b* are provided with a gap therebetween along the front-rear direction (X-axis direction) in each of the vent hole 96*g* in the left wall 96*e* and the vent hole 96*h* in the right wall 96*f* of the heat sink 96. The second fin 96*b* is a plate-shaped fin extending in the left-right direction (Y-axis direction) and the height direction (Z-axis direction).

As illustrated in FIGS. 13 and 14, a plurality of third fins 96*c* are provided to protrude forward from the front wall 96*i* of the heat sink 96 with a gap therebetween along the left-right direction (Y-axis direction). The third fin 96*c* is a plate-shaped fin extending in the front-rear direction (X-axis direction) and the height direction (Z-axis direction). As illustrated in FIGS. 14 and 5, the third fins 96*c* are disposed in the intake port 12*g*.

In the air flow F as illustrated in FIG. 17, the third tins 96*c* are located at the most upstream, and the second fins 96*b* are located at the most downstream. That is, the air that has entered the intake port 12*g* by rotation of the fan 98 first passes between a plurality of third fins 96*c*. The air is then guided by the first surface 96*m* of the bottom plate 96*d* while flowing between a plurality of first fins 96*a* and separates to be directed toward the two vent holes 96*g* and 96*h*. As illustrated in FIG. 15, the air passes between the second fins 96*b* provided in the vent holes 96*g* and 96*h*, and then flows out to the outside through the exhaust ports 12*h* and 12*i* provided in the upper protruding part 12*c* of the housing 12.

As illustrated in FIG. 13, the heat sink 96 is provided with ring seals 102 and 104 that close gaps between the upper protruding part 12*c* and the heat sink 96 so that the air that has passed through the vent holes 96*g* and 96*h* of the heat sink 96 passes through the exhaust ports 12*h* and 12*i* with no leakage. The heat sink 96 is provided with finger guards 106 and 108 that prevent entry of a user's finger into the exhaust ports 12*h* and 12*i*.

Through the exhaust ports 12*h* and 12*i*, a liquid such as rain water may come inside the upper protruding part 12*c* and stay on the bottom plate 96*d* of the heat sink 96. Considering such a case, a bottom surface 96*n* of the vent hole 96*g* of the heat sink 96 is provided at a lower level than the first surface 96*m* of the bottom plate 96*d* as illustrated in FIG. 16. This vent hole 96*g* allows the liquid on the bottom plate 96*d* of the heat sink 96 to easily comes out of the upper protruding part 12*c*.

Figure 18:
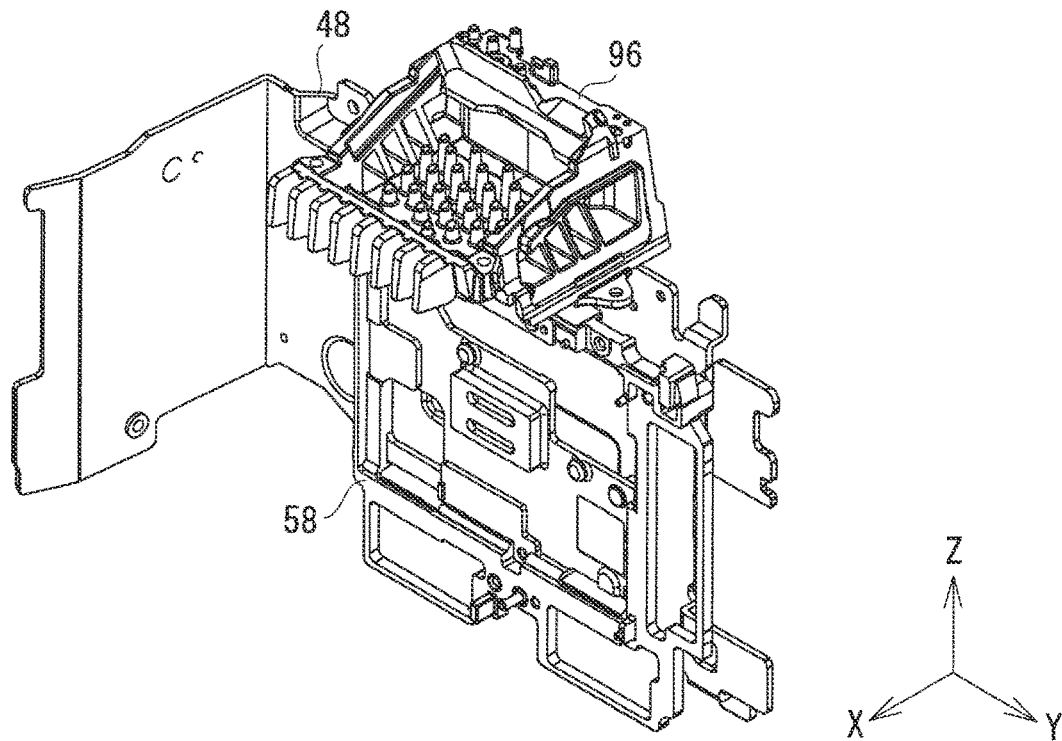
FIG. 18 is a perspective view illustrating connection between the heat sink and an object to be cooled of the imaging apparatus according to one embodiment of the present disclosure.
Figure 19:
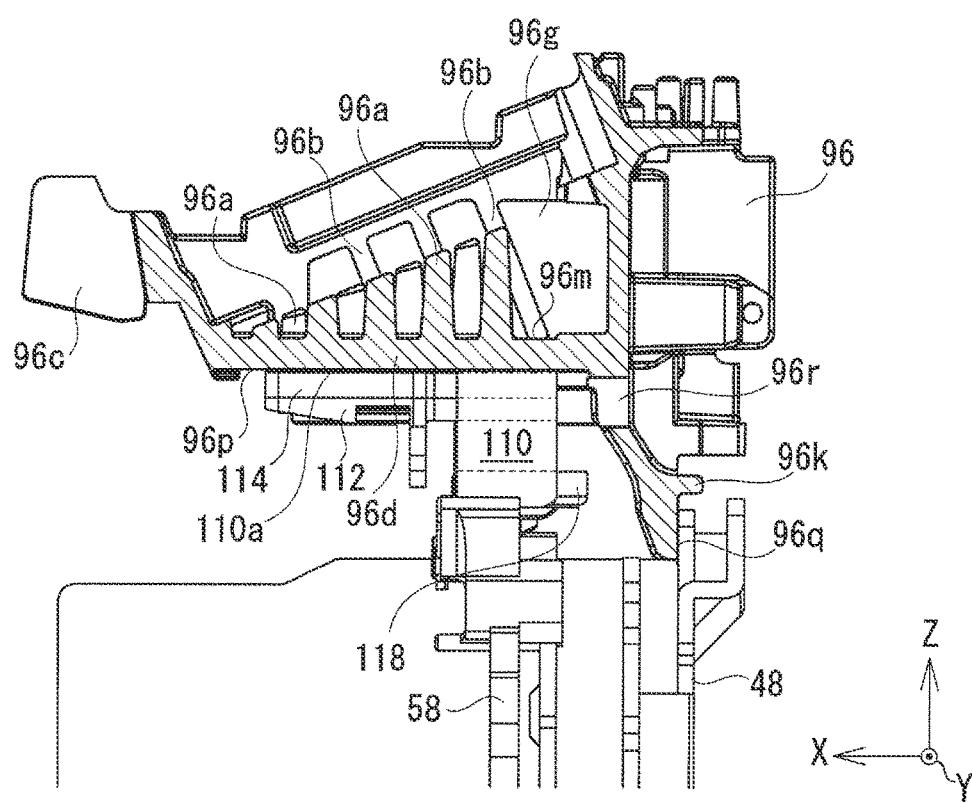
FIG. 19 is a cross-sectional view illustrating connection between the heat sink and the object to be cooled of the imaging apparatus according to one embodiment of the present disclosure.

FIGS. 18 and 19 are respectively a perspective view and a cross-sectional view illustrating connection between the heat sink and an object to be cooled in the imaging apparatus according to one embodiment of the present disclosure.

As described above, the cooling module 90 is for forcibly cooling the image sensor 54 on the sensor module 50 of the imaging module 40 and the IC chips 84 on the main circuit board 44. Thus, as illustrated in FIGS. 18 and 19, the heat sink 96 of the cooling module 90 is in contact with the movable frame 58 that supports the image sensor 54 which is a heat source and with the heat transfer plate 48 that is in contact with the IC chips 84 which are heat sources, That is, the movable frame 58 and the heat transfer plate 48 are objects to be cooled by the cooling module 90.

As illustrated in FIG. 19, in the embodiment, the movable frame 58 that is a first object to be cooled is in contact with (connected to) the heat sink 96 of the cooling module 90 via a heat conductive sheet 110.

Figure 20:
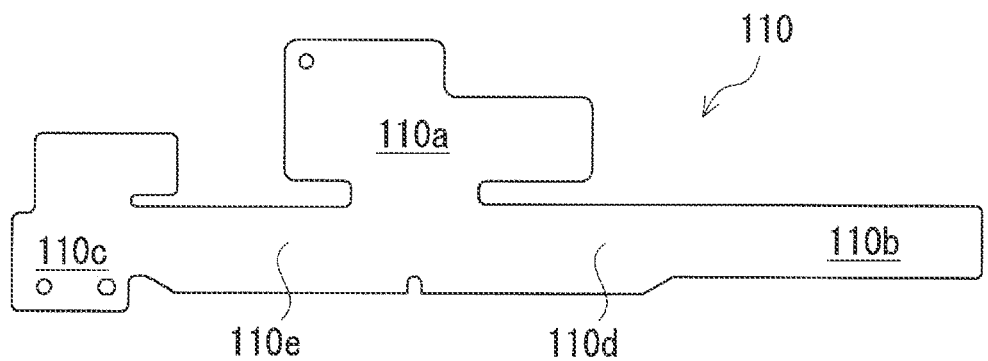
FIG. 20 is a developed view of a heat conductive sheet of the imaging apparatus according to one embodiment of the present disclosure.
Figure 21:
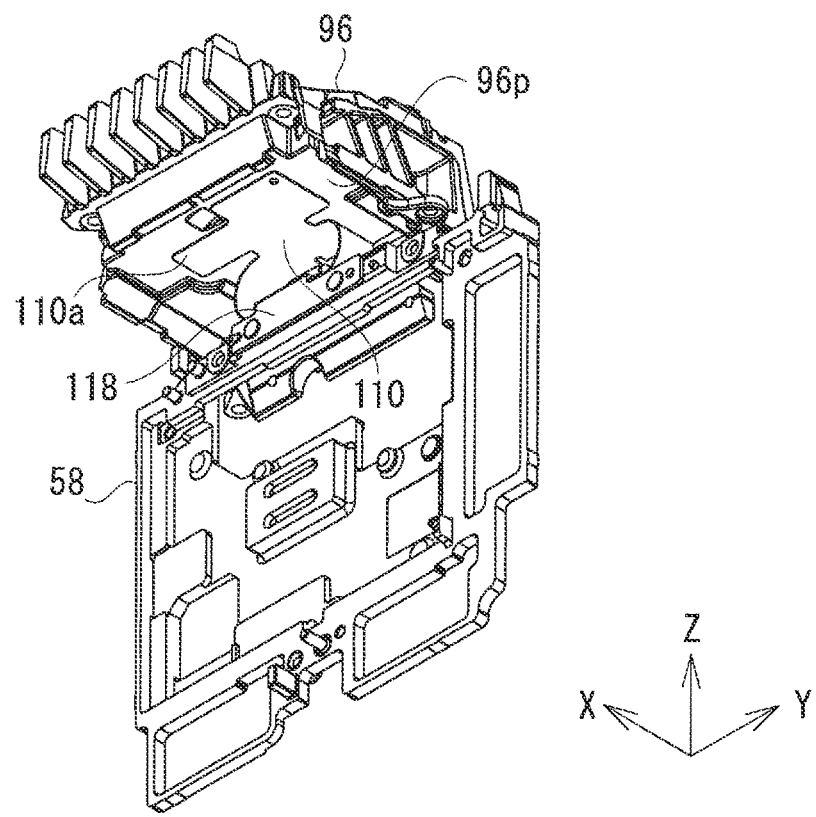
FIG. 21 is a lower perspective view illustrating connection between the heat sink and the heat conductive sheet of the imaging apparatus according to one embodiment of the present disclosure.
Figure 22:
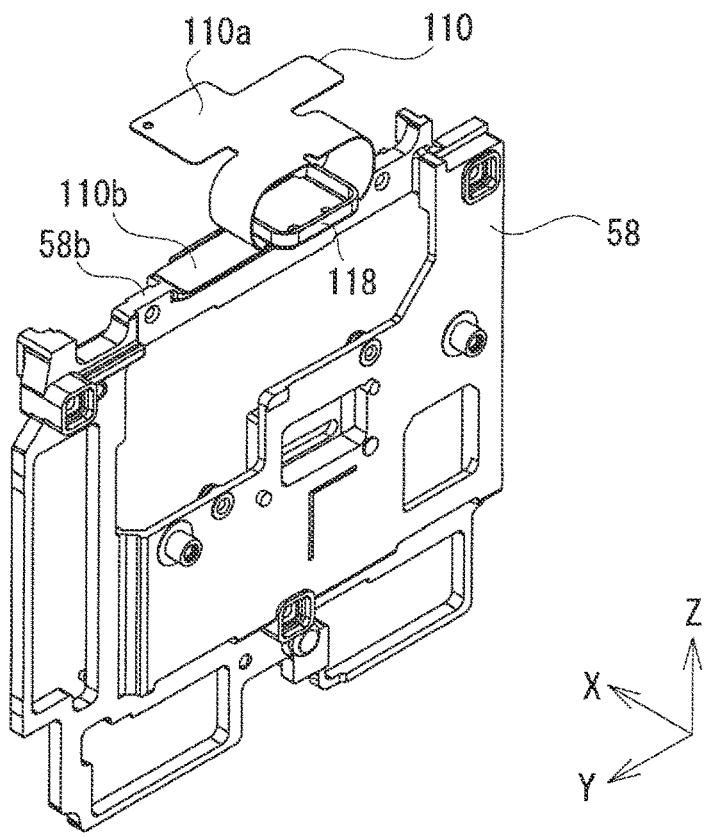
FIG. 22 is a rear perspective view illustrating connection between the heat conductive sheet and a first object to be cooled of the imaging apparatus according to one embodiment of the present disclosure.
Figure 23:
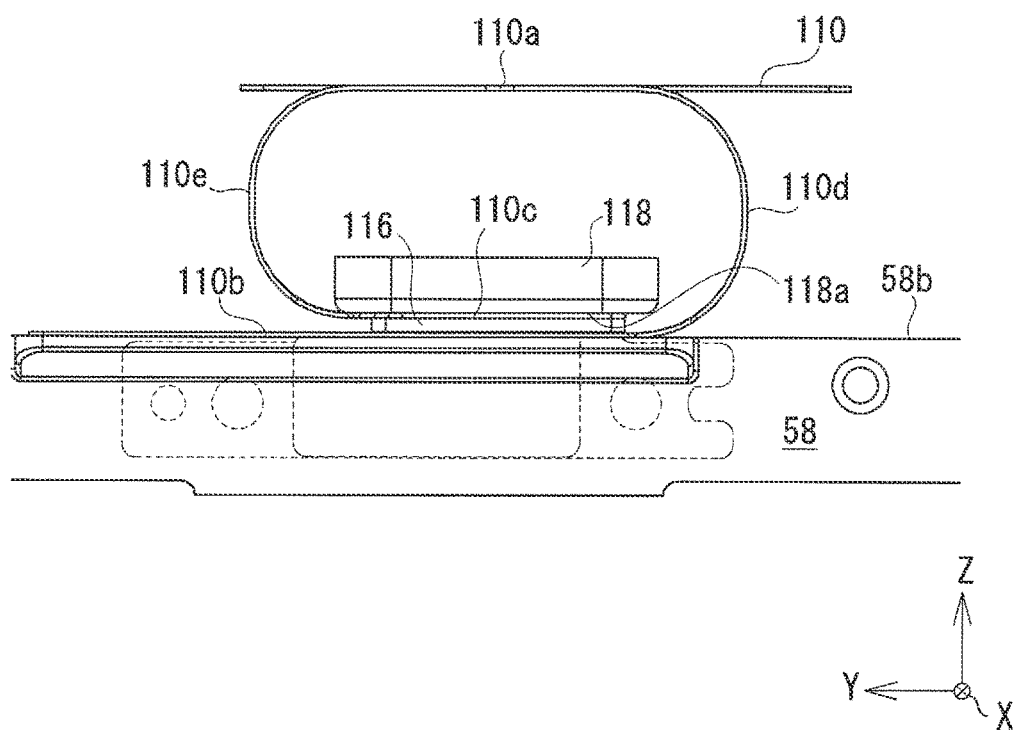
FIG. 23 is a rear view illustrating connection between the heat conductive sheet and the first object to be cooled of the imaging apparatus according to one embodiment of the present disclosure.
Figure 24:
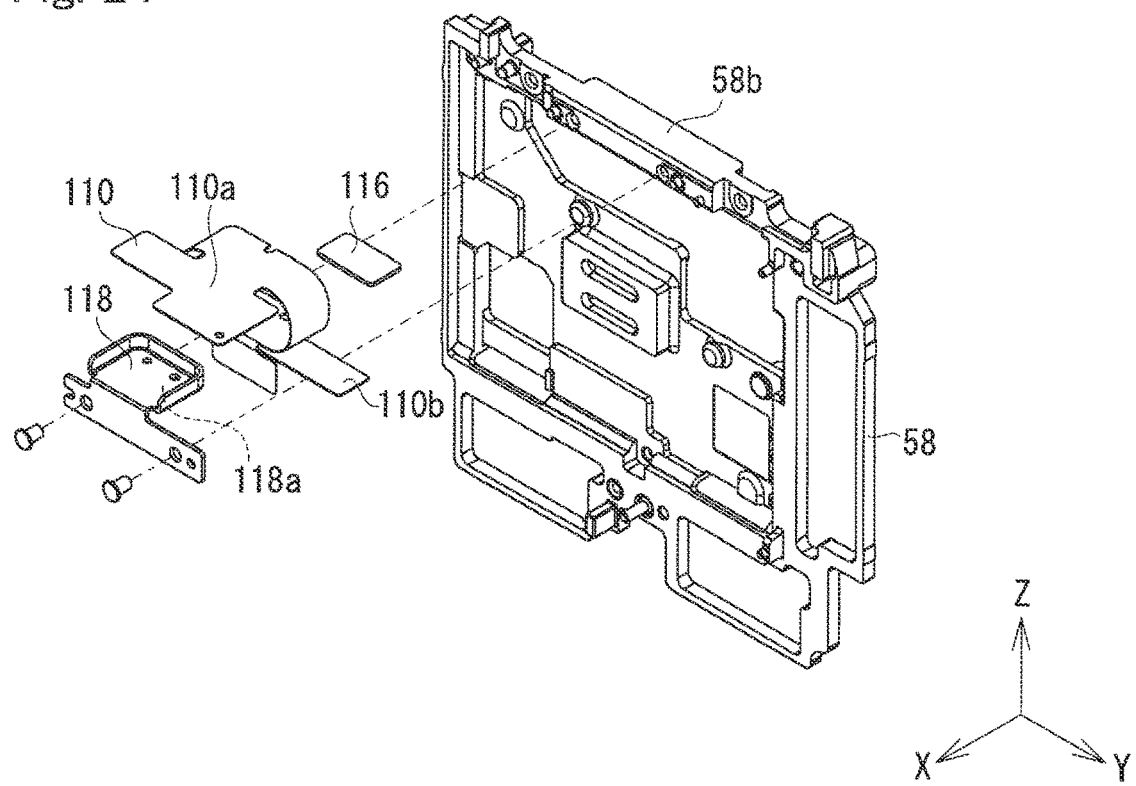
FIG. 24 is an exploded perspective view illustrating connection between the heat conductive sheet and the first object to be cooled of the imaging apparatus according to one embodiment of the present disclosure.

FIG. 20 is a developed view of the heat conductive sheet of the imaging apparatus according to one embodiment of the present disclosure, FIG. 21 is a lower perspective view illustrating connection between the heat sink and the heat conductive sheet of the imaging apparatus according to one embodiment of the present disclosure. FIG. 22 is a rear perspective view illustrating connection between the heat conductive sheet and a first object to be cooled of the imaging apparatus according to one embodiment of the present disclosure. FIG. 23 is a partial rear view illustrating connection between the heat conductive sheet and the first object to be cooled of the imaging apparatus according to one embodiment of the present disclosure. FIG. 24 is an exploded perspective view illustrating connection between the heat conductive sheet and the first object to be cooled of the imaging apparatus according to one embodiment of the present disclosure.

As illustrated in FIG. 20, the heat conductive sheet 110 is made of, for example, a material having high thermal conductivity and flexibility. In the embodiment, the heat conductive sheet 110 is a graphite sheet made of graphite having high thermal conductivity.

As illustrated in FIGS. 20 to 23, the heat conductive sheet 10 includes a heat dissipating part 110*a* connected to (in contact with) the heat sink 96, and first and second heat absorbing parts 110*b* and 110*c* connected to (in contact with) the movable frame 58, which is an object to be cooled. The first and second heat absorbing parts 110*b* and 1100 are provided at ends of a pair of band-shaped pieces 110*d* and 110*e* that extend in opposite directions.

As illustrated in FIG. 21, the heat dissipating part 110*a* of the heat conductive sheet 110 is connected to (in contact with) a second surface 96*p* (first connection part) of the bottom plate 96*d* of the heat sink 96. The second surface 96*p* is in the opposite side of the first surface 96m on which the first fins 96a are provided. Heat is dissipated from the heat conductive sheet 110 to the heat sink 96 via the heat dissipating part 110a.

As illustrated in FIG. 19, contact between the heat dissipating part 110a of the heat conductive sheet 110 and the second surface 96p of the bottom plate 96d of the heat sink 96 is maintained by a sheet pressing member 112. The sheet pressing member 112 is in contact with the heat conductive sheet 110 via an elastic member 114 such as a urethane foam to maintain contact between the heat conductive sheet 110 and the heat sink 96. As illustrated in FIGS. 9 and 10, the sheet pressing member 112 is attached to the front frame 60 of the sensor module 50.

As illustrated in FIG. 23, the first and second heat absorbing parts 110b and 110c of the heat conductive sheet 110 are connected to the movable frame 58. Specifically, the first heat absorbing part 110b and the second heat absorbing part 110c are overlappingly connected to the top surface 58b of the movable frame 58. Precisely, the first heat absorbing part 110b is directly connected to the top surface 58b, and the second heat absorbing part 110c is indirectly in contact with the top surface 58b. That is, a pair of band-shaped pieces 110d and 110e form a loop in which the first heat absorbing part 110b and the second heat absorbing part 110c overlap each other.

An elastic member 116 such as a urethane foam is disposed between the first heat absorbing part 110b and the second heat absorbing part 110c. A stacked body including the first heat absorbing part 110b, the elastic member 116, and the second heat absorbing part 110c is sandwiched between the bottom surface 118a of the sheet pressing member 118 fixed to the movable frame 58 and the top surface 58b of the movable frame 58. By the elastic member 116, the first heat absorbing part 110b is biased toward the top surface 58b of the movable frame 58 to keep contact therewith, and the second heat absorbing part 110c is biased toward the bottom surface 118a of the sheet pressing member 118 to keep contact therewith. The elastic member 116 maintains connection between the first heat absorbing part 110b and the movable frame 58 and connection between the second heat absorbing part 110c and the movable frame 58 via the sheet pressing member 118.

In the embodiment, like the movable frame 58, the sheet pressing member 118 is made of a material having high thermal conductivity such as aluminum. Thus, the heat of the movable frame 58 is directly transferred to the first heat absorbing part 110b, and to the second heat absorbing part 110c via the sheet pressing member 118. In this case, the elastic member 116 may be made of a material having low thermal conductivity.

The movable frame 58 and the sheet pressing member 118 may be integrated as a single part.

The reason why the movable frame 58 and the heat sink 96 are connected via the heat conductive sheet 110 is that the movable frame 58 is displaceable with respect to the heat sink 96. Displacement of the movable frame 58 causes deformation of the heat conductive sheet 110. To allow the heat conductive sheet 110 to deform easily, as illustrated in FIG. 23, the heat conductive sheet 110 is disposed between the movable frame 58 and the heat sink 96 so as the thickness direction of the heat conductive sheet 110 to be parallel with a direction of displacement (the left-right direction (Y-axis direction) and the height direction (Z-axis direction)) of the movable frame 58.

Unlike the movable frame 58, the heat transfer plate 48 as the second object to be cooled is directly connected to (in contact with) the heat sink 96.

Figure 25:
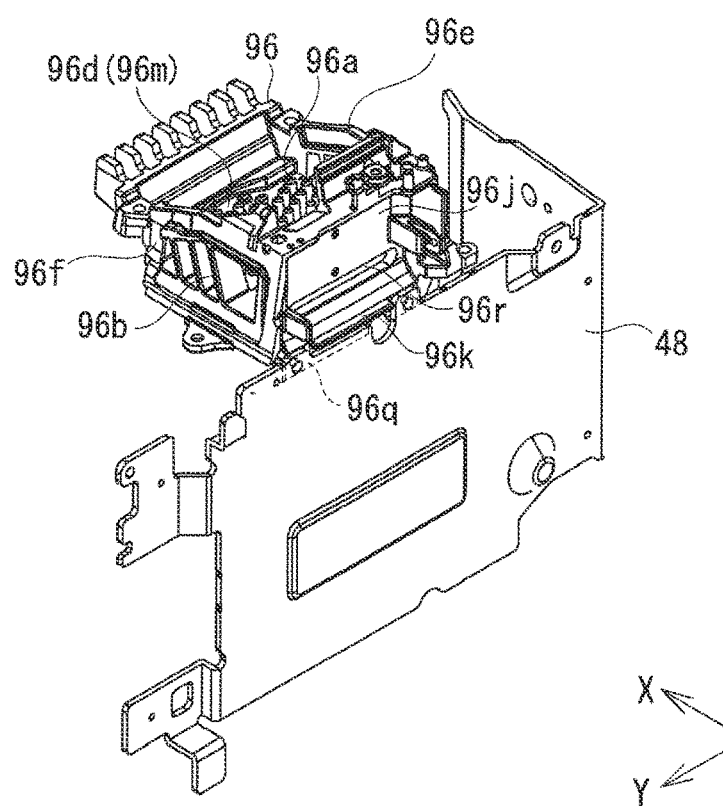
FIG. 25 is a rear perspective view illustrating connection between the heat sink and a second object to be cooled of the imaging apparatus according to one embodiment of the present disclosure.
Figure 26:
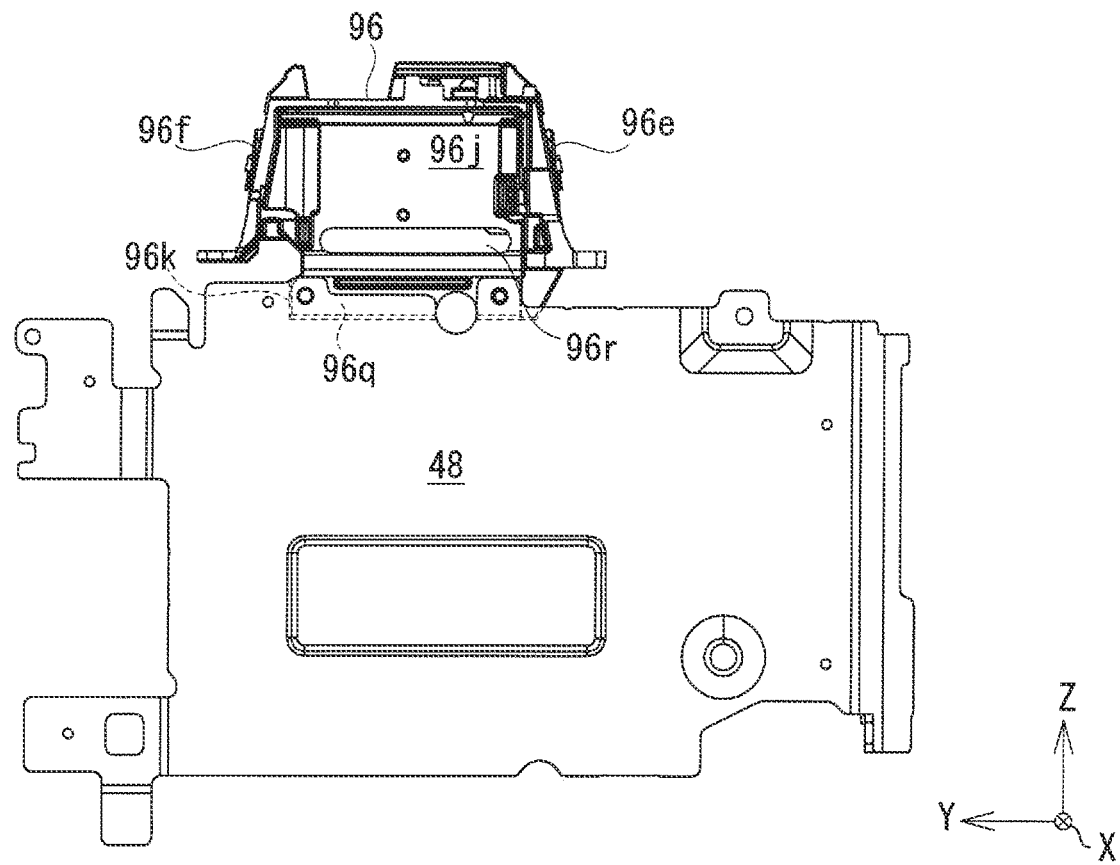
FIG. 26 is a rear view illustrating connection between the heat sink and the second object to be cooled of the imaging apparatus according to one embodiment of the present disclosure.

FIGS. 25 and 26 are respectively a rear perspective view and a rear view illustrating connection between the heat sink and the second object to be cooled of the imaging apparatus according to one embodiment of the present disclosure.

As illustrated in FIGS. 25 and 26, the heat sink 96 has on the tongue part 96k a contact surface 96q (second connection part) for making contact with the heat transfer plate 48. The heat transfer plate 48 is fixed to the tongue part 96k by screws, for example, to keep contact with the contact surface 96q.

The configuration of the imaging apparatus 10 according to one embodiment of the present disclosure has been described above. Some features of the imaging apparatus 10 according to one embodiment of the present disclosure will now be described in more detail.

As illustrated in FIG. 23, the heat conductive sheet 110 includes the first heat absorbing part 110b and the second heat absorbing part 110c. The feature of the first heat absorbing part 110b and the second heat absorbing part 110c overlappingly connected to the first object to be cooled (movable frame 58) will be described.

Figure 27A:
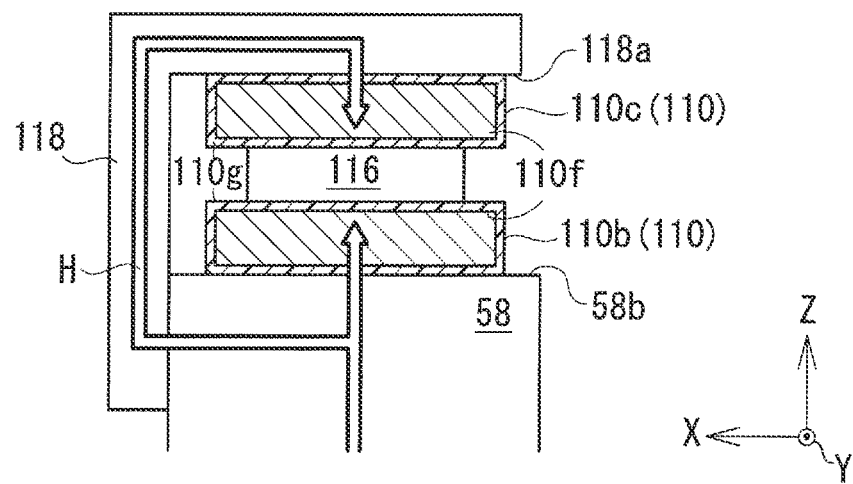
FIG. 27A is a schematic view of connection between a heat conductive sheet and a first object to be cooled according to an example.
Figure 27B:
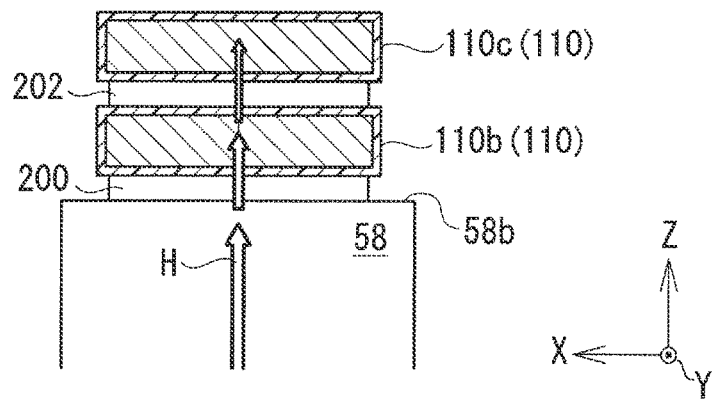
FIG. 27B is a schematic view of connection between a heat conductive sheet and a first object to be cooled according to a comparative example.

FIG. 27A is a schematic view of connection between a heat conductive sheet and a first object to be cooled according to an example. FIG. 27B is a schematic view of connection between a heat conductive sheet and a first object to be cooled according to a comparative example.

First, a heat conductive sheet 110, that is, a graphite sheet 110 includes a graphite layer 110f that substantially conducts heat, and a resin layer 110g (for example, a PET layer) that protects the graphite layer 110f.

As illustrated in FIG. 27A, heat H (heat absorbed from the image sensor 54) in the movable frame 58 transfers into the graphite layer 110f in a first heat absorbing part 110b directly in contact with the top surface 58b, and also transfers into the graphite layer 110f in a second heat absorbing part 110c via the bottom surface 118a of the sheet pressing member 118. The heat then transfers to the heat sink 96 via the heat dissipating part 110a connected to the heat sink 96 as illustrated in FIG. 21. Note that, the contact between the top surface 58b and the first heat absorbing part 110b and the contact between the bottom surface 118a and the second heat absorbing part 110c are maintained by biasing by the elastic member 116.

These connection among the heat conductive sheet 110, the movable frame 58, and the sheet pressing member 118 increases the amount of heat transferred from the movable frame 58 to the heat conductive sheet 110 without enlarging the contact surface between the heat conductive sheet 110 and the movable frame 58. Specifically, the contact surface with the heat conductive sheet 110 can be increased by connecting the first and second heat absorbing parts 110b and 110c overlapping each other to the movable frame 58 and the sheet pressing member 118. In this manner, the amount of heat transferred from the movable frame 58 to the heat conductive sheet 110 can be increased without enlarging the contact surface between the heat conductive sheet 110 and the movable frame 58.

As illustrated in FIG. 27A, the first heat absorbing part 110b and the second heat absorbing part 110c of the heat conductive sheet 110 are fixed to movable frame 58 with no double-sided tape, which serves as thermal resistance, therebetween. Thus, substantially no heat loss occurs between the movable frame 58 and the first heat absorbing part 110b and between the sheet pressing member 118 and the second heat absorbing part 110c.

As in the comparative example illustrated in FIG. 27B, when the first heat absorbing part 110b is fixed to the movable frame 58 via a double-sided tape 200 and the second heat absorbing part 110c is fixed to the first heat absorbing part 110b via a double-sided tape 202, the amount of heat H transferred to the second heat absorbing part 110c decreases. That is, the double-sided tape 200 causes heat loss between the first heat absorbing part 110b and the movable frame 58, and the double-sided tape 202 causes heat loss between the first heat absorbing part 110b and the second heat absorbing part 110c. As a result, a sufficient amount of heat H cannot be transferred to the second heat absorbing part 110c, and thus, the amount of heat transferred from the movable frame 58 to the heat conductive sheet 110 is small.

In the embodiment, as illustrated in FIG. 23, the elastic member 116 is disposed between the first heat absorbing part 110b and the second heat absorbing part 110c to form a stacked body, and the stacked body is sandwiched between the top surface 58b of the movable frame 58 and the bottom surface 118a of the sheet pressing member 118. However, the embodiment of the present disclosure is not limited to this configuration.

Figure 28:
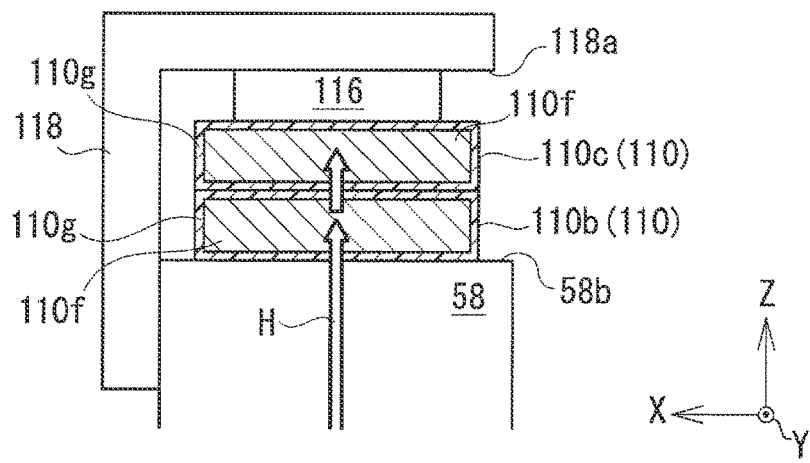
FIG. 28 is a schematic view illustrating connection between a heat conductive sheet and a first object to be cooled of an imaging apparatus according to another embodiment of the present disclosure.

FIG. 28 is a schematic view illustrating connection between a heat conductive sheet and a first object to be cooled of an imaging apparatus according to another embodiment of the present disclosure.

In another embodiment as illustrated in FIG. 28, a first heat absorbing part 110b and a second heat absorbing part 110c of a heat conductive sheet 110 are overlapped and directly in contact with each other. In this case, an elastic member 116 is disposed between a bottom surface 118a of a sheet pressing member 118 and a second heat absorbing part 110c. Such connection is effective when thermal resistance of a resin layer 110g of the heat conductive sheet 110 is low. Alternatively, it is effective when the heat conductive sheet 110 is a copper sheet or an aluminum sheet with no resin layer, unlike a graphite sheet.

The description has been made assuming that the thermal conductivity of the elastic member 116 is low, but the elastic member 116 may be made of a material having high thermal conductivity.

As illustrated in FIG. 20, the heat conductive sheet 110 that transfers heat from the movable frame 58 to the heat sink 96 is a single sheet. However, the embodiment of the present disclosure is not limited to this configuration. For example, a plurality of heat conductive sheets may transfer heat from the movable frame 58 to the heat sink 96.

Figure 29:
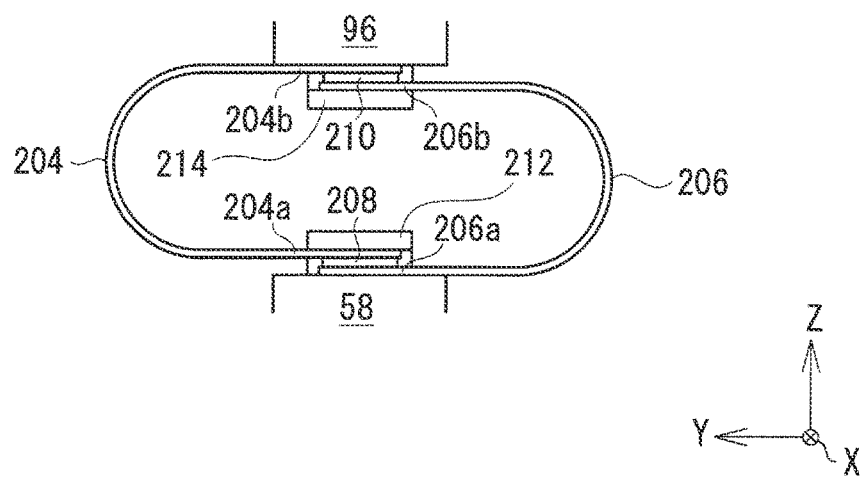
FIG. 29 is a schematic view illustrating connection between a heat dissipation member and a first object to be cooled via a plurality of heat conductive sheets of an imaging apparatus according to still another embodiment of the present disclosure.

FIG. 29 is a schematic view illustrating connection between a heat dissipation member and a first object to be cooled via a plurality of heat conductive sheets of an imaging apparatus according to still another embodiment of the present disclosure.

As illustrated in FIG. 29, an imaging apparatus according to the still another embodiment includes a first heat conductive sheet 204 and a second heat conductive sheet 206 that transfer heat from a movable frame 58 to a heat sink 96.

The first heat conductive sheet 204 is band-shaped and includes a first heat absorbing part 204a that absorbs heat from the movable frame 58 and a first heat dissipating part 204b that dissipates heat to the heat sink 96.

The second heat conductive sheet 206 is band-shaped and includes a second heat absorbing part 206a that absorbs heat from the movable frame 58 and a second heat dissipating part 206b that dissipates heat to the heat sink 96.

An elastic member 208 maintains connection of the first heat absorbing part 204a of the first heat conductive sheet 204 and the second heat absorbing part 206a of the second heat conductive sheet 206 to the movable frame 58. Specifically, the elastic member 208 is disposed between the first heat absorbing part 204a and the second heat absorbing part 206a to bias the first heat absorbing part 204a toward a tape pressing member 212 connected to the movable frame 58 so as to allow heat to transfer and bias the second heat absorbing part 206a toward the movable frame 58.

An elastic member 210 maintains connection of the first heat dissipating part 204b of the first heat conductive sheet 204 and the second heat dissipating part 206b of the second heat conductive sheet 206 to the heat sink 96. Specifically, the elastic member 210 is disposed between the first heat dissipating part 204b and the second heat dissipating part 206b to bias the first heat dissipating part 204b toward the heat sink 96 and bias the second heat dissipating part 206b toward the tape pressing member 214 connected to the heat sink 96 so as to allow heat transfer.

According to the still another embodiment, the amount of heat transferred from the movable frame 58 to the heat sink 96 can be easily increased only by increasing the number of heat conductive sheets.

Note that, the heat conductive sheet 110 illustrated in FIG. 20 is equivalent to the configuration in which the first heat dissipating part 204b of the first heat conductive sheet 204 and the second heat dissipating part 206b of the second heat conductive sheet 206 are integrated (shared as a single part). That is, the first and second heat dissipating parts 204b and 206b can be regarded as different portions of a single heat conductive sheet 110.

Figure 30:
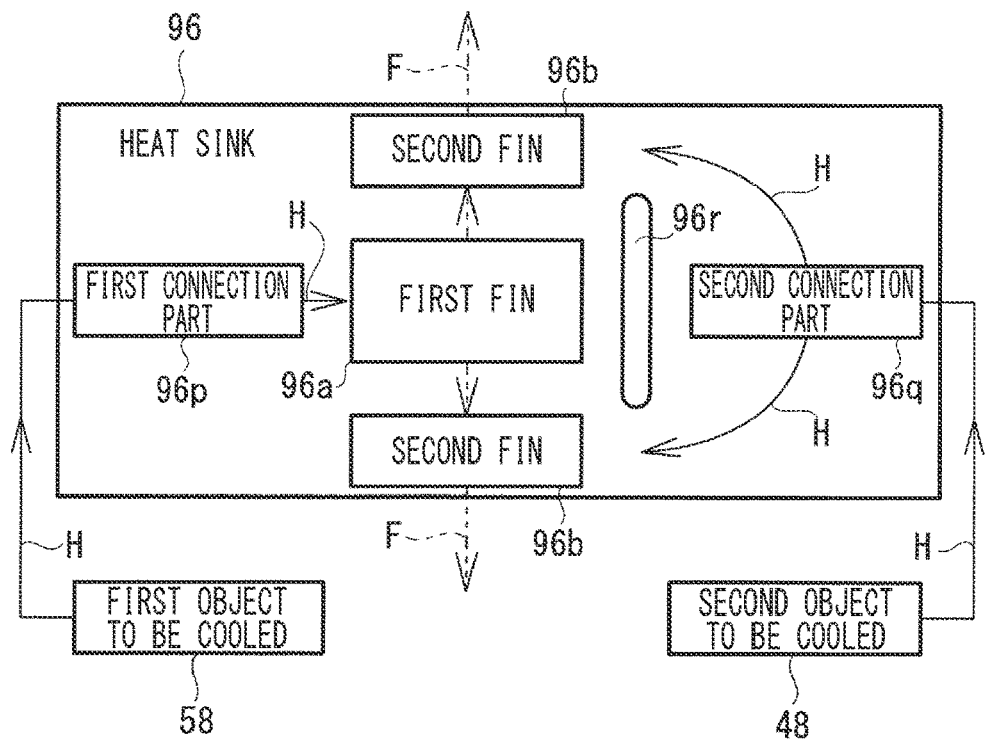
FIG. 30 is a schematic view illustrating heat conduction in the heat sink of the imaging apparatus according to one embodiment of the present disclosure.

Next, features of the heat dissipation member (heat sink 96) connected to the first object to be cooled (movable frame 58) and the second object to be cooled (heat transfer plate 48) to cool these objects will be described, FIG. 30 is a schematic view illustrating heat conduction in the heat sink of the imaging apparatus according to one embodiment of the present disclosure.

As illustrated in FIG. 30, heat from the first object to be cooled 58 (movable frame) is preferentially dissipated by the first fins 96a of the heat sink 96. Thus, in the heat sink 96 as illustrated in FIG. 19, the first connection part 96p (second surface) connected to the first object to be cooled 58 via the heat conductive sheet 110 is positioned closer to the first fins 96a than the second connection part 96q (contact surface) connected to the second object to be cooled 48 (heat transfer plate).

As illustrated in FIGS. 30 and 19, the heat sink 96 includes a cutout 96r provided between the second connection part 96q and the first fins 96a to hinder heat conduction along the shortest distance from the second connection part 96q to the first fins 96a. The cutout 96r is provided in the heat sink 96 as a space with no medium that conducts heat. That is, an air layer in the cutout 96r serves as a heat insulator. In the embodiment, as illustrated in FIGS. 19 and 26, the cutout 96r is formed in the tongue part 96k as a through hole that is elongated in the left-right direction (Y-axis direction) and penetrating the tongue part 96k in the front-rear direction (X-axis direction). The through hole has a larger length in the left-right direction than the depth in the front-rear direction. Specifically, the cutout 96r as a through hole has a length in the left-right direction longer than the distance between the left end of the cutout 96r and the left end of the tongue part 96k and the distance between the right end of the cutout 96r and the right end of the tongue part 96k.

By positioning the first and second connection parts 96*p* and 96*q* with respect to the first fins 96*a* as described above and providing the cutout 96*r*, the heat of the first object to be cooled 58 (movable frame) connected to the first connection part 96*p* is preferentially dissipated by the first fins 96*a* as compared with the heat of the second object to be cooled 48 (heat transfer plate) connected to the second connection part 96*q*.

The heat H received from the second object to be cooled 48 at the second connection part 96*q* is conducted toward the first fins 96*a*, bypassing the cutout 96*r*. To reduce heat conducted toward the first fins 96*a* and bypassing the cutout 96*r*, the second fin 96*b* is provided on a heat conduction path. Specifically, as illustrated in FIG. 26, the heat H of the second connection part 96*q* is conducted toward two ends in the left-right direction (Y-axis direction) of the cutout 96*r* as a through hole. The heat bypassing the cutout 96*r* is directed toward the left wall 96*e* and the right wall 96*f*. As illustrated in FIG. 17, heat is conducted toward the second fin 96*b* in the vent hole 96*g* in the left wall 96*e* and the second fin 96*b* in the vent hole 96*h* in the right wall 96*f*, and is dissipated by the second fins 96*b*. The heat is dissipated because the second fins 96*b* are cooled by the air flow F. With the help of the second fins 96*b*, the heat of the first object to be cooled 58 (movable frame) connected to the first connection part 96*p* is preferentially dissipated by the first fins 96*a* compared to the heat of the second object to be cooled 48 (heat transfer plate) connected to the second connection part 96*q*. In other words, the heat of the first object to be cooled 58 is preferentially dissipated by the first fins 96*a*, and the heat of the second object to be cooled 48 is preferentially dissipated by the second fins 96*b*. As a result, each of the first object to be cooled 48 and the second object to be cooled 58 maintains high cooling efficiency.

As illustrated in FIG. 17, the first fins 96*a* are located upstream of the second fins 96*b* along the air flow F for cooling the heat sink 96. Cooling of the first object to be cooled 58 (movable frame) is given a higher priority than cooling of the second object to be cooled 48 (heat transfer plate). For example, the allowable temperature (the temperature under which stable operation is ensured) of the image sensor 54 which is a heat source and whose heat is absorbed by the first object to be cooled 58 is lower than the allowable temperature of the IC chip 84 whose heat is absorbed by the second object to be cooled 48. Since heat conduction from the second object to be cooled 48 to the first fins 96*a* is reduced, the first fins 96*a* can reliably cool the first object to be cooled 58 which is given a high priority.

Features of the heat dissipation member (heat sink 96) including a plurality of types of first to third fins 96*a* to 96*c* of different shapes will be described.

Figure 31:
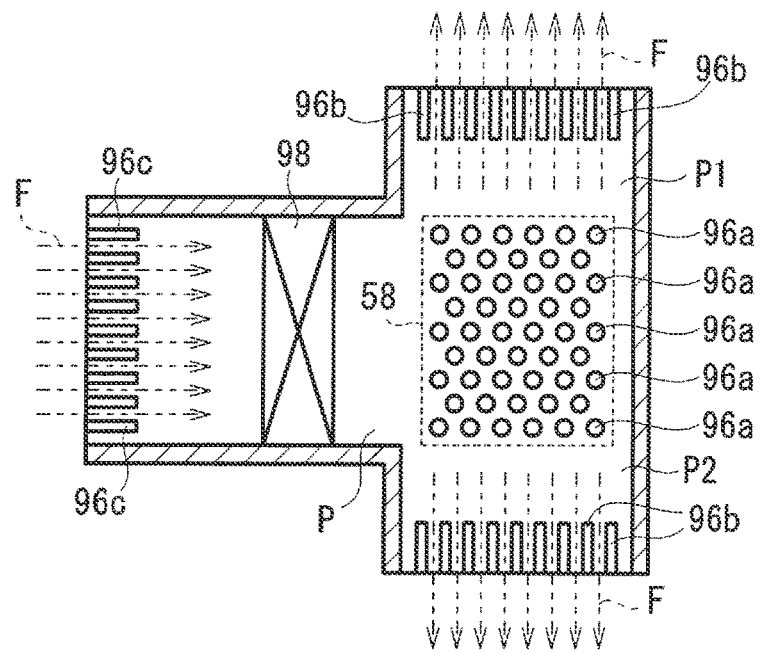
FIG. 31 is a schematic view illustrating air flows passing through first to third fins of the heat sink of the imaging apparatus according to one embodiment of the present disclosure.

FIG. 31 is a schematic view illustrating air flows passing through the first to third fins of the heat sink of the imaging apparatus according to one embodiment of the present disclosure.

As illustrated in FIGS. 31 and 17, the heat sink 96 includes the pin-shaped first fins 96*a*, the plate-shaped second fins 96*b*, and the plate-shaped third fins 96*c* disposed in the flow path P in which air flow F is generated.

As illustrated in FIG. 31, the pin-shaped first fins 96*a* are disposed in a flow direction diverter that is in the flow path P and changes the direction of the air flow F. Specifically, as illustrated in FIG. 17, the first fins 96*a* are disposed on the first surface 96*m* of the bottom plate 96*d* of the heat sink 96.

As illustrated in FIG. 31, the plate-shaped second fins 96*b* are disposed in sections of the flow path P downstream of the flow direction diverter provided with the first fins 96*a*. Specifically, as illustrated in FIG. 17, the second fins 96*b* are disposed in the vent hole 96*g* and the vent hole 96*h*, which are provided in the left wall 96*e* and the right wall 96*f* erected from two ends, in the left-right direction (Y-axis direction), of the bottom plate 96*d*.

As illustrated in FIG. 31, the plate-shaped third fins 96*c* are disposed in a section of the flow path P upstream of the flow direction diverter provided with the first fins 96*a*. The fan 98 is provided upstream of the first fins 96*a*, and the third fins 96*c* are provided upstream of the fan 98. Specifically, as illustrated in FIG. 17, the third fins 96*c* protrude forward from the front wall 96*i* erected from the front end of the bottom plate 96*d*.

In the embodiment, the flow direction diverter in the flow path P where the first fins 96*a* are provided is a branching part at which the flow path P branches in a plurality of different directions. In the embodiment, the flow path P branches in 180-degrees different directions along the left-right direction (Y-axis direction). The second fins 96*b* are disposed on branched paths P1 and P2 branched from the flow path P at the branching part. Specifically, the branched paths P1 and P2 are respectively a space in the vent hole 96*g* in the left wall 96*e* and a space in the vent hole 96*h* in the right wall 96*f*.

The first object to be cooled 58 (movable frame) is connected to a portion of the heat sink 96 closer to the first fins 96*a* than the second fins 96*b* and the third fins 96*c*. Specifically, as illustrated in FIG. 19, the first object to be cooled 58 is connected to the second surface 96*p* of the bottom plate 96*d* via the heat conductive sheet 110. The second surface 96*p* is in the opposite side of the first surface 96*m* on which the first fins 96*a* are provided.

The heat sink 96 having such a fin structure can further efficiently cool the first object to be cooled 58, The inventor has performed a simulation to arrive at a concept of the heat sink 96 having such a fin structure.

Figure 32:
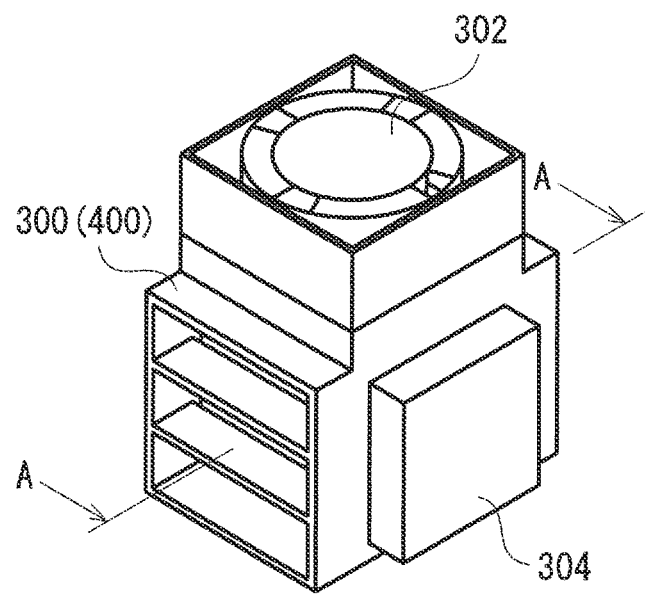
FIG. 32 is a view illustrating a simulation model of a heat sink for calculating temperature distribution of the heat sink.
Figure 33A:
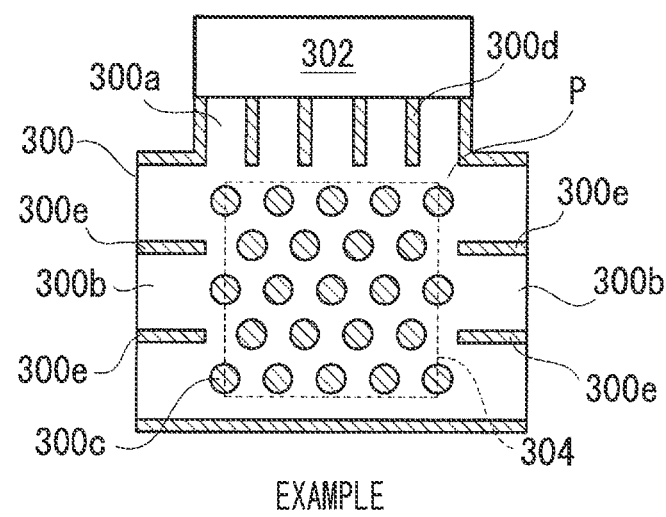
FIG. 33A is a cross-sectional view of a simulation model of a heat sink of the example.
Figure 33B:
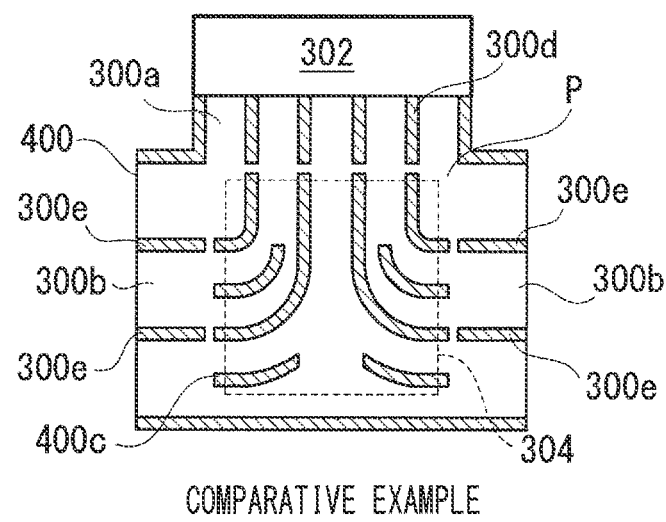
FIG. 33B is a cross-sectional view of a simulation mod& of a heat sink of the comparative example.
Figure 34:
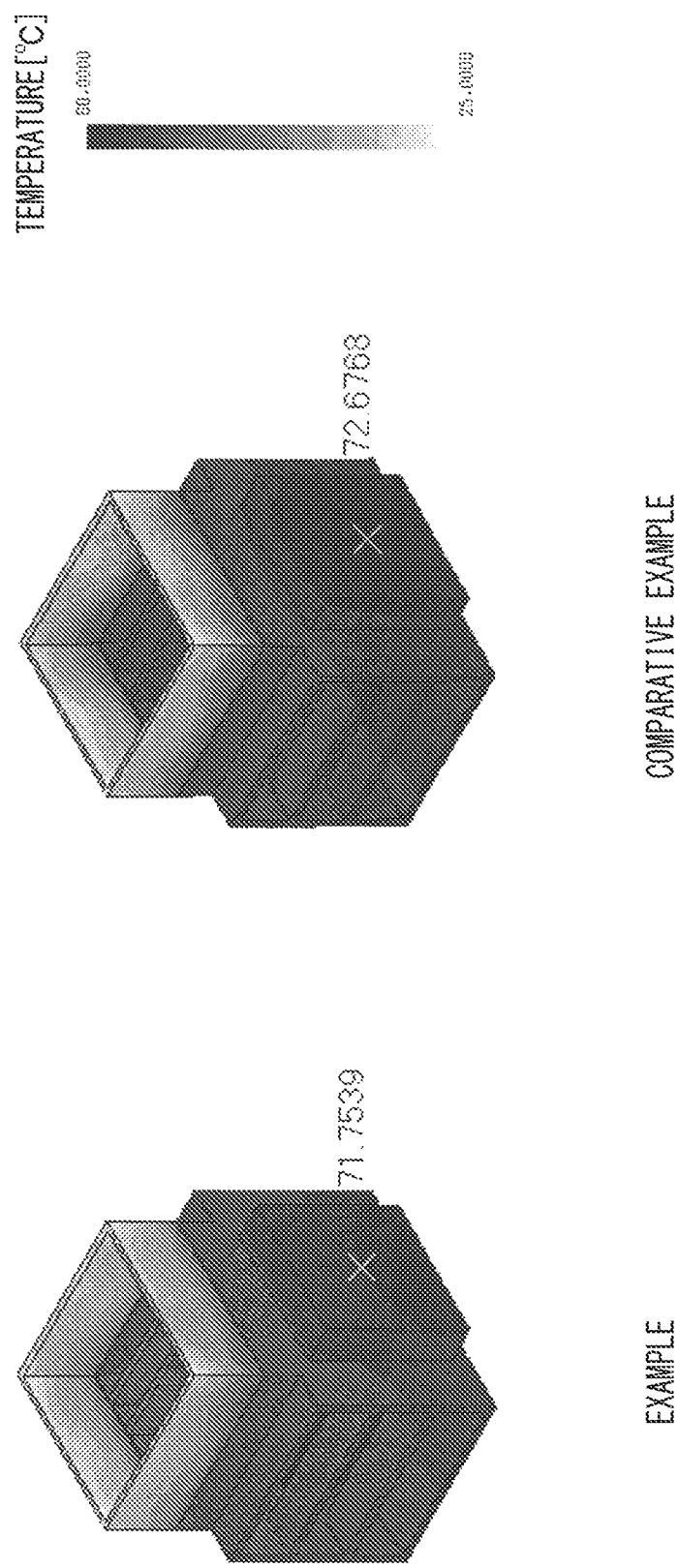
FIG. 34 is temperature distribution maps of the heat sinks of the example and the comparative example.

FIG. 32 is a view illustrating a simulation model of a heat sink for calculating temperature distribution of the heat sink. FIG. 33A is a cross-sectional view of a simulation model of a heat sink of an example. FIG. 33B is a cross-sectional view of a simulation model of a heat sink of a comparative example. FIG. 34 is temperature distribution maps of the heat sinks of the example and the comparative example. Note that, these cross-sectional views are taken along line A-A in FIG. 32.

As illustrated in FIGS. 32, 33A, and 33B, the inventor created simulation models of a heat sink 300 of the example and a heat sink 400 of the comparative example, and performed simulation to obtain temperature distributions of these models. Note that, the heat sinks 300 and 400 of the example and the comparative example are substantially the same except that the shapes of first fins 300*c* and 400*c* are different.

Specifically, each of the heat sinks 300 and 400 of the example and the comparative example includes a T-shaped internal flow path P, a single intake port 300*a*, and two exhaust ports 300*b* on opposite sides. A fan 302 is attached to the single intake port 300*a* to generate air flows in the internal flow path P to flow from the single intake port 300*a* to the two exhaust ports 300*b*.

The single intake port 300*a* is provided with plate-shaped third fins 300*d*. Each of the two exhaust ports 300*b* is provided with plate-shaped second fins 300*e*.

The first fins 300*c* and 400*c* are provided in a flow direction diverter in the flow path P, that is, in a section of the flow path P between the two exhaust ports 300*b*. The first fins 300*c* of the heat sink 300 of the example are pin-shaped fins. The first fins 400c of the heat sink 400 of the comparative example are plate-shaped fins extending along the air flow. A heat source 304 that is an object to be cooled is attached to outer surfaces of the heat sinks 300 and 400. The heat source 304 is on the opposite side of the first fins 300c or 400c.

The simulation was performed under the condition of an environment of 25° C., the heat source 304 generating heat with a thermal output of 12 w, and the fan 302 rotating at a rotation speed of 6000 rpm. The internal surfaces of the heat sinks 300 and 400 have the same surface area of about 4600 square millimeters.

The temperature distributions illustrated in FIG. 34 were obtained by the simulation. The temperature of the heat source 304 for the heat sink 300 of the example was about 72 degrees. The temperature of the heat source 304 for the heat sink 400 of the comparative example was about 73 degrees. The difference in temperature of the heat source 304 by about 1 degree is caused by the difference in the shape of the first fins 300c and 400c provided in the flow direction diverter in the flow path P.

From the results of the simulation illustrated in FIG. 34, the inventor has concluded that providing pin-shaped fins instead of plate-shaped fins in the flow direction diverter in the flow path improves heat dissipation efficiency of the fins and can further cool the object to be cooled attached to the heat sink.

In the simulation, the pin-shaped fins are provided in a branching part of the flow path. However, providing pin-shaped fins in a flow direction diverter that changes the direction of flow without branching the flow in the flow path is considered to provide the same effect. For a case where the air from the fan 98 hits the first pins 96a obliquely with respect to the protruding direction (Z-axis direction) of the first pins 96a as illustrated in FIG. 14, an effect similar to that of the heat sink 300 of the example of the simulation model including the first pins 300c which the air hits at a direction orthogonal to the protruding direction of the first pins 300c can be obtained. That is, even when the direction of air flow immediately before hitting the pin-shaped first fins differs, the obtained effect is considered to be substantially the same.

According to the embodiment described above, in an imaging apparatus in which a plurality of objects to be cooled are connected to a single heat dissipation member, high cooling efficiency can be maintained for each object to be cooled.

The embodiment of the present disclosure has been described with reference to the embodiment described above. However, the embodiment of the present disclosure is not limited to the embodiment described above.

That is, in a broad sense, the imaging apparatus according to the embodiment of the present disclosure includes a first object to be cooled, a second object to be cooled, and a heat dissipation member including a first connection part connected to the first object to be cooled, a second connection part connected to the second object to be cooled, and first fins. The first connection part is provided at a position closer to the first fins than the second connection part, and the heat dissipation member includes a cutout in a portion between the second connection part and the first fins.

As described above, the embodiment has been described to illustrate the technique in the present disclosure. In relation to this, the accompanying drawings and the detailed description have been provided. To illustrate the technique, the components described in the accompanying drawings and the detailed description may include not only components essential for solving the problem but also components not essential for solving the problem. Accordingly, it should not be simply recognized that such non-essential components are essential because that those non-essential components are described in the accompanying drawings and the detailed description.

The embodiment is described above to illustrate the technique of the present disclosure, so that various changes, replacements, additions, and omissions, for example, can be made for the embodiment within the scope of the claims and equivalents thereof.

The present disclosure is applicable to an electronic device having a structure for cooling, using a heat sink, an object to be cooled such as a heat source.

What is claimed is:

1. An imaging apparatus comprising:
    a first object to be cooled;
    a second object to be cooled; and
    a heat dissipation member including a first connection part connected to the first object to be cooled, a second connection part connected to the second object to be cooled, and a first fin, wherein
    the first connection part is provided at a position closer to the first fin than the second connection part, and
    the heat dissipation member includes a cutout in a portion between the second connection part and the first fin and does not include a cutout in a portion between the first connection part and the first fin.

2. The imaging apparatus according to claim 1, wherein
    the heat dissipation member further includes a second fin, and
    the second fin is provided on a conduction path of heat that is conducted from the second connection part toward the first fin while bypassing the cutout.

3. The imaging apparatus according to claim 2, further comprising
    a fan that generates air flow for cooling the heat dissipation member, wherein
    the first fin is located upstream of the second fin in a direction of the air flow.

4. The imaging apparatus according to claim 3, wherein
    the first object to be cooled has a first allowable temperature under which stable operation is ensured,
    the second object to be cooled has a second allowable temperature under which stable operation is ensured, and
    the first allowable temperature of the first object to be cooled is lower than the second allowable temperature of the second object to be cooled.

5. The imaging apparatus according to claim 3, wherein
    the heat dissipation member includes a bottom plate having a first surface facing the fan and a second surface including the first connection part, a pair of side walls erected from two ends, in a first direction, of the bottom plate toward the fan and each including a vent hole, and a tongue part extending from an end, in a second direction orthogonal to the first direction, of the bottom plate in a direction away from the fan and including the second connection part,
    the first fin is provided on the first surface of the bottom plate,
    the second fin is provided in the vent hole of each of the pair of side walls, and the tongue part has, as the cutout, a through hole having a larger length in the first direction than a depth in the second direction and penetrating the tongue part in the second direction.

* * * * *